US012785507B2

(12) United States Patent
Zhang

(10) Patent No.: US 12,785,507 B2
(45) Date of Patent: Nov. 3, 2026

(54) OIL COOLED MOTOR HEAT DISSIPATION STRUCTURE AND MOTOR

(71) Applicant: BorgWarner PowerDrive Systemes (Tianjin) Co., Ltd., Tianjin (CN)

(72) Inventor: Dongliang Zhang, Tianjin (CN)

(73) Assignee: BorgWarner PowerDrive Systemes (Tianjin) Co., Ltd., Tianjin (CN)

(*) Notice: Subject to any disclaimer, the term of this patent is extended or adjusted under 35 U.S.C. 154(b) by 205 days.

(21) Appl. No.: 18/699,460

(22) PCT Filed: Oct. 29, 2021

(86) PCT No.: PCT/CN2021/127638
§ 371 (c)(1),
(2) Date: Apr. 8, 2024

(87) PCT Pub. No.: WO2023/056674
PCT Pub. Date: Apr. 13, 2023

(65) Prior Publication Data
US 2025/0239915 A1 Jul. 24, 2025

(30) Foreign Application Priority Data
Oct. 8, 2021 (CN) .......................... 202111169425.1

(51) Int. Cl.
*H02K 9/19* (2006.01)

(52) U.S. Cl.
CPC ...................................... *H02K 9/19* (2013.01)

(58) Field of Classification Search
CPC ............. H02K 9/19; H02K 5/203; H02K 1/20
(Continued)

(56) References Cited

U.S. PATENT DOCUMENTS 5,363,002 A 11/1994 Hernden
2012/0001504 A1 1/2012 Erfanfar
(Continued)

FOREIGN PATENT DOCUMENTS

CN 1398452 A 2/2003
CN 203645474 U 6/2014
(Continued)

OTHER PUBLICATIONS

English Translation of CN211183563U (Year: 2020).*
The search report of counterpart EP application No. 21959763.0 issued on Jan. 29, 2025.

*Primary Examiner* — Terrance L Kenerly
*Assistant Examiner* — Theodore L Perkins
(74) *Attorney, Agent, or Firm* — The Sun IP Law

(57) ABSTRACT

Some embodiments of the present disclosure provide an oil cooled motor heat dissipation structure and a motor. The oil cooled motor heat dissipation structure includes oil spray parts which are arranged at two ends of a stator core. An outside diameter of the oil spray part is not less than an outside diameter of the stator core, and the oil spray part is in contact with a case, an outer surface of the stator core, the case and the oil spray parts construct a cooling medium flow chamber, so as to facilitate the flowing of a cooling medium in the cooling medium flow chamber along the outer surface of the stator core. The oil spray part is provided with an oil spray channel. One end of the oil spray channel is communicated with the cooling medium flow chamber, the other end is communicated with a chamber inside the motor.

16 Claims, 19 Drawing Sheets

(58) Field of Classification Search
USPC .......................................................... 310/54
See application file for complete search history.

(56) References Cited

U.S. PATENT DOCUMENTS

| | | | | |
|---|---|---|---|---|
| 2016/0118862 | A1 | 4/2016 | Maki-Ontto | |
| 2019/0006914 | A1 * | 1/2019 | Graves | F16H 57/046 |

FOREIGN PATENT DOCUMENTS

| | | | | |
|---|---|---|---|---|
| CN | 204858880 | U | | 12/2015 |
| CN | 109428422 | A | | 3/2019 |
| CN | 111555503 | A | | 8/2020 |
| CN | 211183563 | U | * | 8/2020 |
| CN | 112421858 | A | | 2/2021 |
| CN | 112615445 | A | | 4/2021 |
| CN | 112636538 | A | | 4/2021 |
| CN | 112751449 | A | | 5/2021 |
| DE | 102012022453 | A1 | | 5/2014 |
| JP | 2006311750 | A | | 11/2006 |
| JP | 2020120536 | A | | 8/2020 |
| KR | 20200085475 | A | | 7/2020 |
| WO | 2021069253 | A1 | | 4/2021 |

* cited by examiner

OIL COOLED MOTOR HEAT DISSIPATION STRUCTURE AND MOTOR

CROSS-REFERENCE TO RELATED APPLICATIONS

The present disclosure is a national stage application of International Patent Application No. PCT/CN2021/127638, which is filed on Oct. 29, 2021, and claims priority to Chinese Patent Application No. 202111169425.1, filed on Oct. 8, 2021, and entitled "Oil Cooled Motor Heat Dissipation Structure and Motor", which are incorporated by reference in their entirety.

TECHNICAL FIELD

The disclosure relates to the technical field of motors, and relates to an oil cooled motor heat dissipation structure and a motor.

BACKGROUND

In recent years, with preferential national policies, new energy automobiles have developed rapidly. Major automobile and component manufacturers are researching and developing new energy automobiles and their supporting facilities that meet market demand. As one of core components, a motor has started to be integrated with a gearbox, a controller, or the like. With higher and higher demand for power density, whether as a whole or as a single motor, its heat dissipation problem has also become more important. Therefore, there are also higher requirements for cooling methods.

At present, oil cooled motors in the art known to inventors are mainly that oil pipes are arranged near the top of a motor stator and the end of a winding, and oil spray holes are designed in the oil pipes. Cooling oil is sprayed from an oil spray port to an outer circular surface of a stator core and the end of the winding. In the above structure, an oil way at the top of a stator and an oil way at the end of the winding are connected in parallel. A parallel structure is that an oil spray pipe component is arranged, and the top of the stator and the end of the winding can only distribute only part oil therein. In general, only a small amount of oil can be distributed to the oil way at the top of the stator, so the heat dissipation performance of the motor is poor.

After the oil is sprayed to the top of the stator core, the oil flows to the bottom of the stator core along an outer surface of the core under the action of gravity. Flowing oil cannot cover all area of the outer surface of the core, and the flowing speed is low. There is still room for the improvement of heat dissipation performance.

SUMMARY

Some embodiments of the present disclosure provide an oil cooled motor heat dissipation structure and a motor to solve the above or other previous problems in the art known to inventors.

In order to solve the above technical problem, the technical solution adopted by the present disclosure is that: an oil cooled motor heat dissipation structure includes an oil spray part, the oil spray parts are arranged at two ends of a stator core. An outside diameter of the oil spray part is not less than an outside diameter of the stator core, and the oil spray part is in contact with a case. An outer surface of the stator core, the case and the oil spray parts construct a cooling medium flow chamber, so as to facilitate the flowing of a cooling medium in the cooling medium flow chamber along outer surface of the stator core.

The oil spray part includes an oil spray channel. One end of the oil spray channel is communicated with the cooling medium flow chamber, and the other end of the oil spray channel is communicated with a chamber inside the motor. The oil spray channel is arranged in a manner of inclining from an end face of the oil spray part to a direction of a stator end winding, so that the cooling medium is sprayed to the stator end winding from the cooling medium flow chamber along oil spray channel.

The oil spray channel includes a plurality of oil spray holes. The plurality of oil spray holes are sequentially arranged along one side surface of the oil spray part which faces the stator core to the other side surface of the oil spray part; there is a distance between axes of the adjacent oil spray holes, and the plurality of oil spray holes are arranged in an inclined direction.

In some embodiments, the distance between the axes of the adjacent oil spray holes is greater than 0, and the oil spray channel is a hole structure with a stepped inner wall.

In some embodiments, the axes of the plurality of oil spray holes are parallel to each other, and along one side surface of the oil spray part which faces the stator core to the other side surface of the oil spray part, the distances between the axes of the plurality of oil spray holes and the axis of the stator core are sequentially decreased.

In some embodiments, in a direction from an oil inlet end to an oil outlet end of the oil spray channel, the width of the oil spray hole along a circumferential direction of the stator core is gradually increased.

In some embodiments, in a direction from an oil inlet end to an oil outlet end of the oil spray channel, the width of the oil spray hole along a circumferential direction of the stator core is the same.

In some embodiments, the shape of the oil spray hole is circular, or square, or elliptical, or rhombic.

In some embodiments, the oil spray channel further includes a first oil spray hole; and the first oil spray hole is arranged at one end of the plurality of oil spray holes, or the oil spray channel further comprises first oil spray holes, the first oil spray holes are arranged at both ends of the plurality of oil spray holes.

In some embodiments, in an axis direction of the stator core, the length of the first oil spray hole is greater than the length of any oil spray hole in the plurality of oil spray holes.

In some embodiments, the axes of the oil spray channel and the stator core intersect and form a predetermined angle $\alpha$, and the predetermined angle $\alpha$ satisfies the following relational expression:

$$0<\alpha<\arctan(L/H)$$

L is the length of the stator end winding, and H is a distance from the oil outlet of the oil spray channel to the stator end winding.

In some embodiments, the oil spray part includes a plurality of silicon steel sheets of at least one type; the plurality of silicon steel sheets are all arranged coaxially with the stator core; the silicon steel sheet is an annular structure; a plurality of stator slots are arranged on a side, which is close to an inside diameter end, of the silicon steel sheet in a circumferential direction; and the plurality of stator slots are in one-to-one correspondence with slots of the stator core, so as to facilitate the arrangement of a stator winding.

In some embodiments, one side, which is close to an outside diameter end of each silicon steel sheet is provided with a plurality of oil spray holes; the plurality of oil spray holes are arranged in the circumferential direction of the silicon steel sheet; and the plurality of oil spray holes are at least formed in an upper half part of the silicon steel sheet which is arranged inside the motor.

The plurality of oil spray holes are arranged in at least one row in a radial direction of the silicon steel sheet.

The distances between the oil spray holes in different silicon steel sheets and the axis of the stator core are different; the distances between the plurality of oil spray holes in each row of each silicon steel sheet and the axis of the stator core are the same; and the positions of the oil spray holes in the plurality of silicon steel sheet are in one-to-one correspondence, so as to construct the oil spray channel.

In some embodiments, one side which is close to the outside diameter end of each silicon steel sheet is provided with multiple groups oil spray holes; the multiple groups oil spray holes are arranged in the circumferential direction of the silicon steel sheet; and the multiple groups oil spray holes are at least formed in an upper half part of the silicon steel sheet which is arranged inside the motor.

The multiple groups oil spray holes are arranged in at least one row in a radial direction of the silicon steel sheet.

In each group of the oil spray holes, the distances from the plurality of oil spray holes to the axis of the stator core are sequentially increased or sequentially decreased; and each of the oil spray holes corresponds to one of the stator slots.

When the plurality of silicon steel sheets are installed, a first silicon steel sheet is taken as a basis, a Nth silicon steel sheet is arranged in a manner of rotating by an angle of $(N-1)\times(M+1)$ stator slot relative to the first silicon steel sheet to construct the oil spray channel, herein M is a number of stator slots between two adjacent oil spray holes.

In some embodiments, a plurality of heat sinks are arranged on an outer surface of the stator core; and the plurality of heat sinks are arranged in the circumferential direction of the stator core.

In some embodiments, the plurality of heat sinks are arranged in multiple groups; multiple groups heat sinks are sequentially arranged in the circumferential direction of the stator core; each of the multiple groups heat sinks includes a first blocking rod, a second blocking rod, and a third blocking rod; the first blocking rod, the second blocking rod, and the third blocking rod are all arranged in an axis direction of the stator core, and the first blocking rod and the second blocking rod are arranged in a same straight line; a gap is arranged between the first blocking rod and the second blocking rod; the third blocking rod is arranged at any side of the first blocking rod; and the third blocking rod corresponds to the gap between the first blocking rod and the second blocking rod.

Or, the length of the heat sink is less than the length of the stator core, and the plurality of heat sinks are arranged in an S-shape.

Or, the plurality of heat sinks are arranged in multiple groups; the multiple groups heat sinks are sequentially arranged in the axis direction of the stator core; each of the multiple groups heat sinks are arranged in the circumferential direction of the stator core, and each heat sink intersects the axis of the stator core; the heat sinks in adjacent two groups are arranged in a staggered manner; in the axis direction of the stator core, the outer surface of the stator core is arranged in a plurality of heat dissipation areas; the multiple groups heat sinks are arranged each of the heat dissipation areas; first inclination directions of the heat sinks in two groups which are arranged on both sides of the heat dissipation area are consistent; and second inclination directions of the heat sinks in the remaining groups except the two groups which are arranged on both sides are consistent, and the second inclination directions of the heat sinks in the remaining groups and the first inclination directions of the heat sinks in the two groups which are arranged on both sides of the heat dissipation area are arranged symmetrically.

Or, the plurality of heat sinks are arranged in multiple groups; the multiple groups heat sinks are sequentially arranged in the axis direction of the stator core; each of the multiple groups heat sinks are arranged in the circumferential direction of the stator core, and each heat sink intersects the axis of the stator core; and the heat sinks in adjacent two groups are arranged in a staggered manner, and the inclination directions of the heat sinks in the two groups are arranged symmetrically.

Or, the plurality of heat sinks are arranged in multiple groups; the multiple groups heat sinks are sequentially arranged in the axis direction of the stator core; each of the multiple groups heat sinks are arranged in the circumferential direction of the stator core, and the heat sink includes a first blocking piece and a second blocking piece; the first blocking piece is connected with the second blocking piece; both the first blocking piece and the second blocking piece are arranged in the circumferential direction of the stator core; the first blocking piece and the second blocking piece are arranged in a stepped manner; the heat sinks in the two adjacent groups are arranged in a staggered manner; and the heat sinks in the two adjacent groups are arranged symmetrically.

In some embodiments, a number of oil spray channels are multiple, the oil spray channels are arranged at an upper half part of the oil spray part which is at least located inside the motor; and multiple oil spray channels are arranged in a circumferential direction of the oil spray part.

In some embodiments, the oil spray part is an annular structure; the oil spray part is arranged at an end, which is close to an outside diameter side of the stator core; and the distance between the axes of the adjacent oil spray holes is equal to 0, and the oil spray channel is a hole structure with a smooth inner wall.

In some embodiments, the axes of the oil spray channel and the stator core intersect and form a predetermined angle $\alpha$, and the predetermined angle $\alpha$ satisfies the following relational expression:

$$0<\alpha<\arctan(L/H)$$

L is the length of the stator end winding, and H is a distance from the oil inlet of the oil spray channel to the stator end winding.

A motor includes the oil cooled motor heat dissipation structure as described above.

Due to the adoption of the above technical solution, there are oil spray parts. The oil spray part is provided with a plurality of oil spray channels. The plurality of oil spray channels are arranged in the circumferential direction of the stator core. An outside diameter end of the oil spray part is in contact with an inner surface of the case of the motor. The oil spray parts are mounted at both ends of the stator core, so that the two oil spray parts, the outer surface of the stator core, and the case construct the cooling medium flow chamber. A case part corresponding to the cooling medium flow chamber is provided with an oil inlet. The oil spray channel is arranged in an inclined manner and points to the stator end winding. The width of the oil inlet end of the oil spray channel is less than that of the oil outlet end, so that the cooling medium is sprayed in a fan-shaped state. Or, in the direction from the oil inlet end to the oil outlet end of the oil spray channel, the widths of the oil spray channel are the same, so that the cooling medium is sprayed in a cylindrical state, and is sprayed onto the stator end winding in a larger area, which omits an oil pipe and an oil pipe connector, is simple in structure, simplifies a mounting process, and improves the heat dissipation efficiency.

The oil spray channel consists of a plurality of oil spray holes. The widths of the oil spray holes are different. The distances from each oil spray hole to the axis of the stator core are different, so that the oil spray channel is a stepped channel, which increases the flow speed of the cooling medium.

The heat dissipation of a stator core and the heat dissipation of an end winding are connected by using a series oil way. Each part is subjected to heat dissipation by using a maximum flow rate of the cooling medium, and the utilization rate of the cooling medium is greater.

The cooling medium enters the cooling medium flow chamber. Since the width of the stepped oil spray channel is small, there will be oil resistance here. Under the action of oil resistance, the cooling medium will fill the space of the cooling medium flow chamber, and all surfaces can be in contact with the oil to achieve an effect of dissipating heat.

The heat sinks are arranged on the outer surface of the stator core, which can change a laminar flow state of the cooling medium into a turbulent state, increases the heat dissipation area of a middle part of the stator core, increases the flow speed of oil, and improves the heat dissipation performance of the motor.

Illustration of the following reference signs are as follows.

1. case; 2. stator core; 3. oil spray part; 4. oil spray channel; 5. cooling medium flow chamber; 6. stator end winding; 7. oil inlet; 8. oil outlet; 9. ineffective hole; 10. effective hole; 11. heat sink; 30. silicon steel sheet; 40. oil spray hole; 41. first oil spray hole; 300. oil spray hole area; 301. stator slot; 302. blank area.

DETAILED DESCRIPTION OF THE EMBODIMENTS

The present disclosure is further described below in combination with accompanying drawings and specific embodiments.

Figure 1:
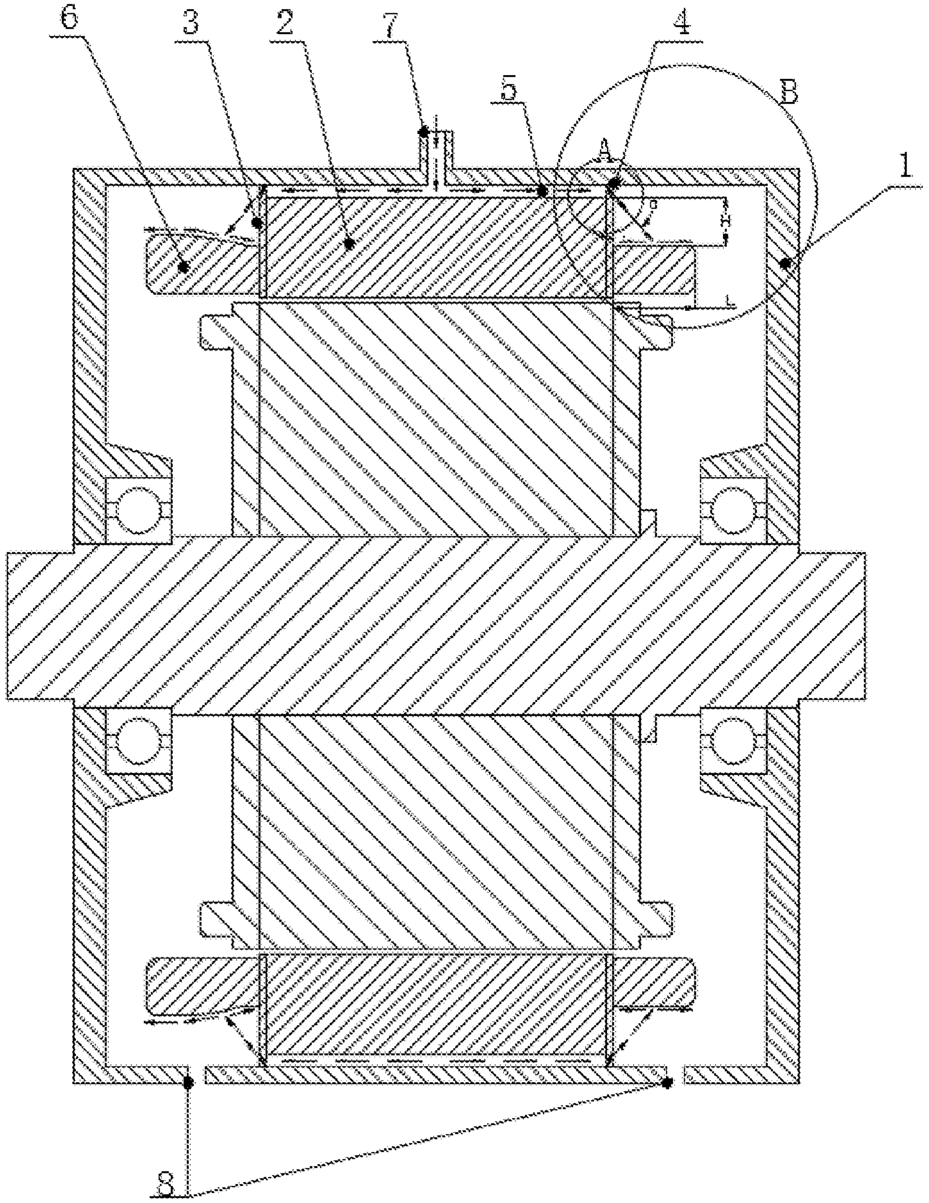
FIG. 1 illustrates a schematic diagram of a sectional structure of a motor of Embodiment 1 of the present disclosure.

FIG. 1 illustrates a schematic diagram of Embodiment 1 of the present disclosure. An embodiment of the present disclosure relates to an oil cooled motor heat dissipation structure and a motor. The heat dissipation structure has oil spray parts. The oil spray parts are arranged at two ends of a stator core. The oil spray parts, the stator core and a case of the motor construct a cooling medium flow chamber. The oil spray part has an oil spray channel arranged in an inclined manner, and the oil spray channel points to a stator end winding, so that a cooling medium can be directly sprayed onto the stator end winding, which omits an oil pipe and an oil pipe connector and simplifies structure and a mounting process. Heat dissipation of the stator core and heat dissipation of an end winding are connected by using a series oil way. Each part is subjected to heat dissipation by using a maximum flow rate of the cooling medium, the utilization rate of the cooling medium is greater, and the heat dissipation capacity of the motor is improved.

Embodiment 1

As shown in FIGS. 1 to 4, an oil cooled motor heat dissipation structure includes oil spray parts 3. The oil spray parts 3 are arranged at two ends of a stator core 2. An outside diameter of the oil spray part 3 is not less than an outside diameter of the stator core 2, and the oil spray part 3 is in contact with a case 1 of a motor, so that an outer surface of the stator core 2, the case 1 and the oil spray parts 3 construct a cooling medium flow chamber 5, thereby facilitating the flowing of a cooling medium in the cooling medium flow chamber 5 along the outer surface of the stator core 2. The mounting position of the stator core 2 is located at a middle position in the case 1 of the motor, so the cooling medium flow chamber 5 is communicated with an oil inlet 7 in order to make a cooling medium enter the cooling medium flow chamber 5, so that the cooling medium can enter the cooling medium flow chamber 5 through the oil inlet 7. The cooling medium located in the cooling medium flow chamber 5 flows along the outer surface of the stator core 2 to cool the stator core 2; and a contact area between the cooling medium and the stator core 2 is large, and the cooling medium flows through the outer surface of the whole stator core 2, which improves the heat dissipating effect of the motor.

The oil spray part 3 is provided with an oil spray channel 4. One end of the oil spray channel 4 is communicated with the cooling medium flow chamber 5, and the other end of the oil spray channel 4 is communicated with a chamber inside the motor. The oil spray channel 4 is arranged in a manner of inclining from an end face of the oil spray part 3 to a direction of a stator end winding 6, so that the cooling medium is sprayed to the stator end winding 6 from the cooling medium flow chamber 5 along the oil spray channel 4. The parts located on an outer side of the cooling medium flow chamber 5 are all chambers inside the motor. Due to the arrangement of the oil spray channel 4, the cooling medium flows out from the cooling medium flow chamber 5 and is directly sprayed to an end of a stator winding, and the cooling medium flows through an inner surface of the stator winding from the end of the stator winding, which improves the heat dissipating effect of the motor. The oil spray channel 4 is a hole structure, so that the cooling medium can be sprayed, rapidly and accurately sprayed to the stator end winding 6, and the cooling medium is sprayed on the whole stator end winding 6 to perform heat dissipation on the stator end winding 6.

After the cooling medium enters the cooling medium flow chamber 5, the cooling medium flows along the outer surface of the stator core 2 in the cooling medium flow chamber 5, and flows through the whole outer surface of the stator core 2. Meanwhile, the cooling medium is sprayed out in an inclined manner from the oil spray channels 4 of the oil spray parts 3 at the two ends of the stator core 2 and sprayed onto the stator end winding 6, so that the cooling medium flows through the inner surface of the stator winding to cool the stator winding and the stator core 2, which increases the flow area of the cooling medium and improves the heat dissipation performance of the motor. The cooling medium is directly sprayed to the stator end winding 6 from the cooling medium flow chamber 5, so that heat dissipation of the stator core and heat dissipation of an end winding are connected by using a series oil way. Each part is subjected to heat dissipation by using a maximum flow rate of the cooling medium, the utilization rate of the cooling medium is greater. The cooling medium enters the cooling medium flow chamber, and since the width of the stepped oil spray channel is small, there can be oil resistance here. Under the action of the oil resistance, the cooling medium can fill the space of the cooling medium flow chamber, and all surfaces can be in contact with the oil to achieve an effect of dissipating heat.

In some embodiments, as shown in FIG. 1, the oil spray parts 3 are located at the two ends of the stator core 2. The oil spray parts 3 are arranged in the circumferential directions of the ends of the stator core 2 and are at least arranged at upper half parts of the ends of the stator core 2 which is located inside the motor. Here, it is set that: the upper half part of the stator core 2 which is located inside the motor is the upper half part of the stator core 2, and the lower half part of the stator core 2 which is located inside the motor is the lower half part of the stator core 2, so that the cooling medium sprays the stator end winding 6 located on the upper half part of the stator core 2. Under the action of gravity, the cooling medium flows through the stator end winding 6 and the inner surface of stator winding at the lower half part to cool the stator winding.

There is a plurality of oil spray channels 4, which are arranged at the upper half part of the oil spray part 3 which is at least located inside the motor. The plurality of oil spray channels 4 are sequentially arranged in the circumferential direction of the oil spray part 3. That is, the plurality of oil spray channels 4 are sequentially arranged in the circumferential direction of the stator core 2, and are distributed throughout the positions of the oil spray part 3 corresponding to the upper half part of the stator core 2, or, the plurality of oil spray channels 4 are distributed throughout the positions of the oil spray part 3 corresponding to the whole end of the stator core 2, so that the cooling medium can spray the stator end winding 6 from various directions at different positions. The number and the arrangement manner of the oil spray channels 4 are selected according to actual demand, and there are no specific requirements here.

Preferably, in this embodiment, the oil spray channels 4 are uniformly arranged in the circumferential direction of the stator core 2, and each oil spray channel 4 corresponds to one stator end winding 6, so that the cooling medium can be sprayed onto each stator end winding 6.

Figure 1A:
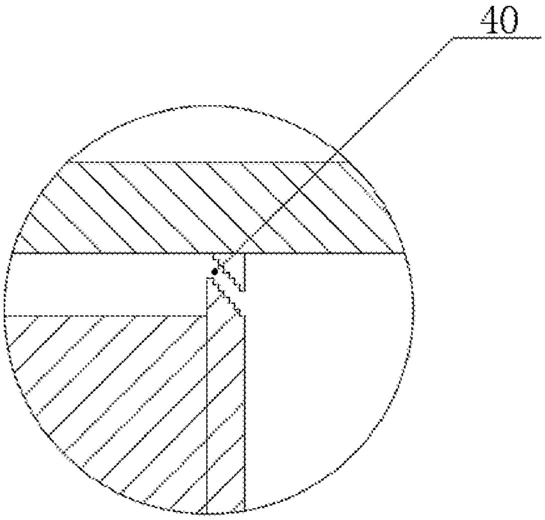
FIG. 1A illustrates an enlarged schematic diagram of a first structure of part A in FIG. 1.
Figure 1B:
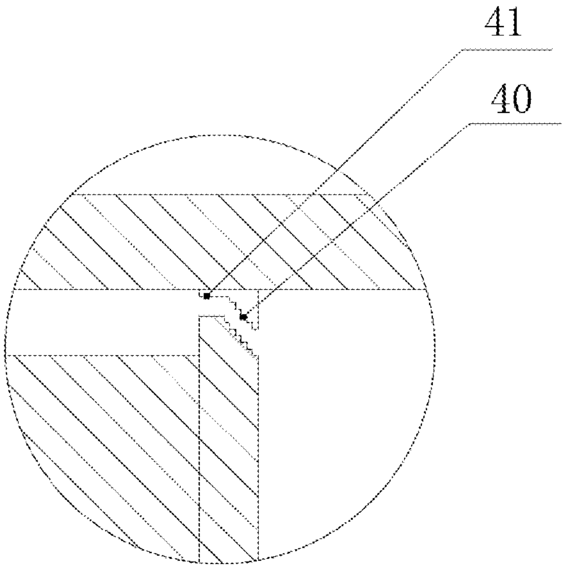
FIG. 1B illustrates an enlarged schematic diagram of a second structure of part A in FIG. 1.
Figure 1C:
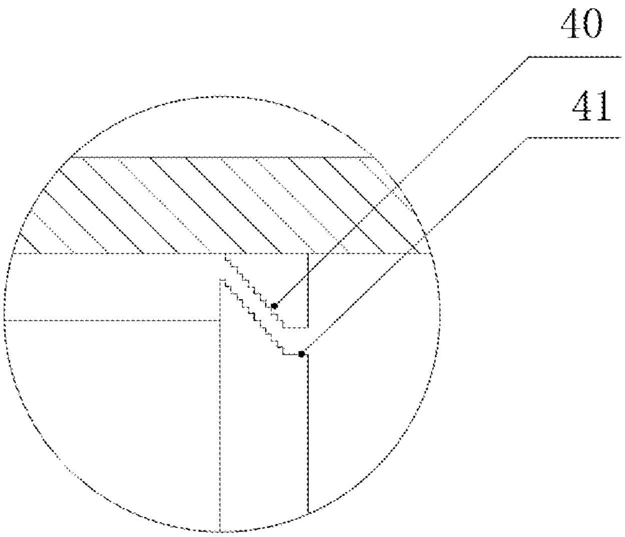
FIG. 1C illustrates an enlarged schematic diagram of a third structure of part A in FIG. 1.
Figure 1D:
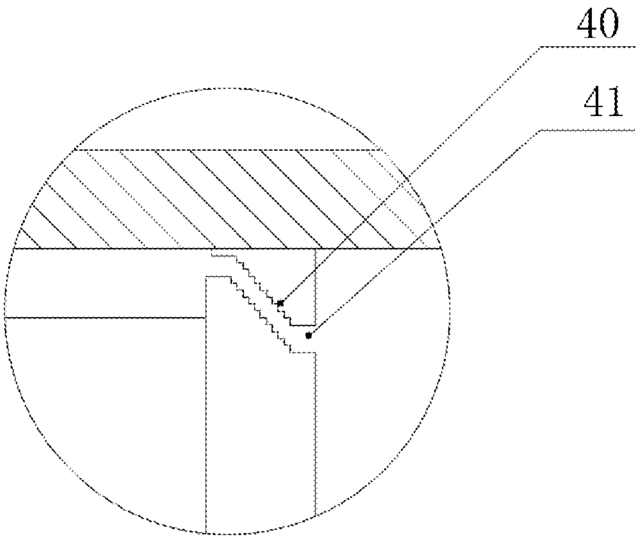
FIG. 1D illustrates an enlarged schematic diagram of a fourth structure of part A in FIG. 1.
Figure 2:
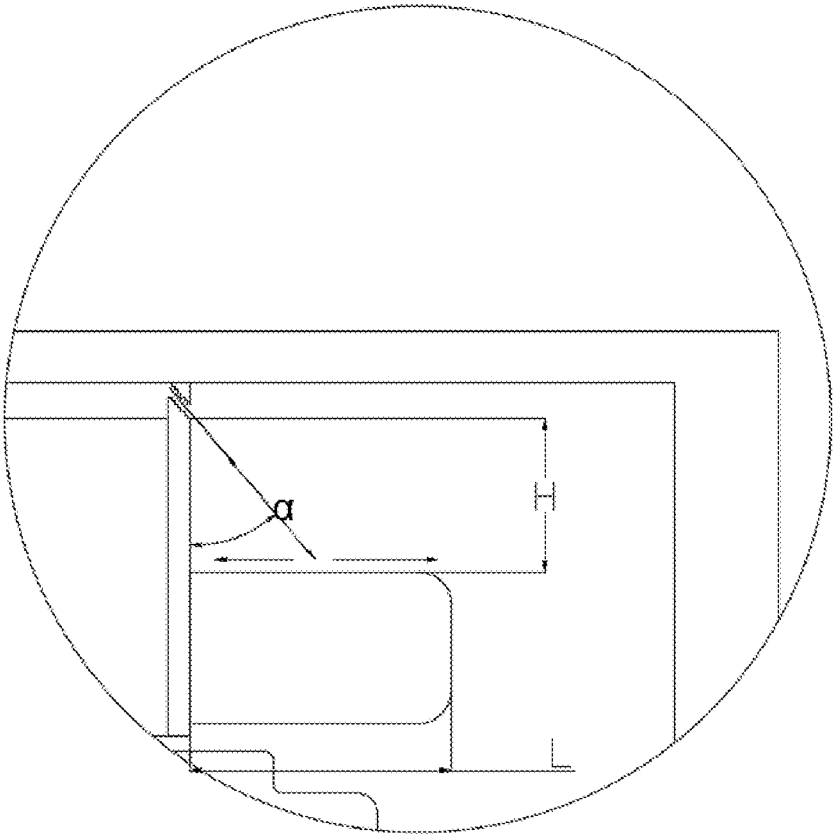
FIG. 2 illustrates an enlarged schematic structural diagram of part B in FIG. 1.
Figure 3:
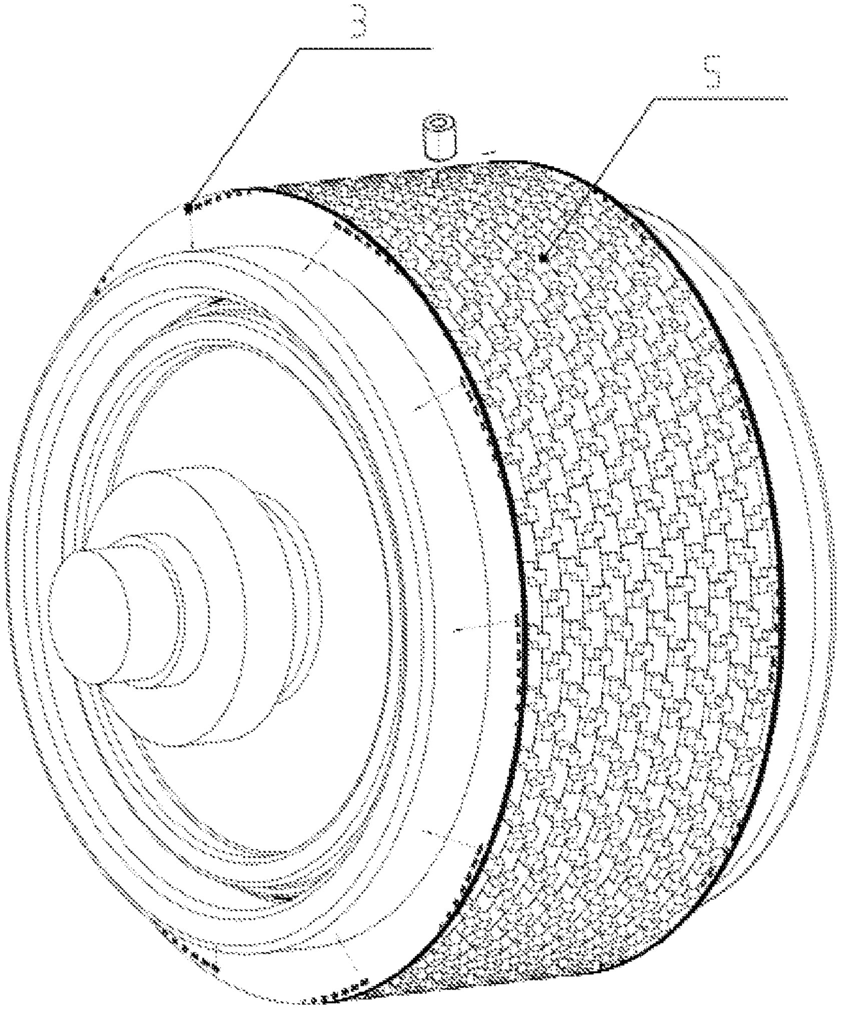
FIG. 3 illustrates a schematic diagram of a flowing state of a cooling medium in a cooling medium flow chamber of the Embodiment 1 of the present disclosure.
Figure 4:
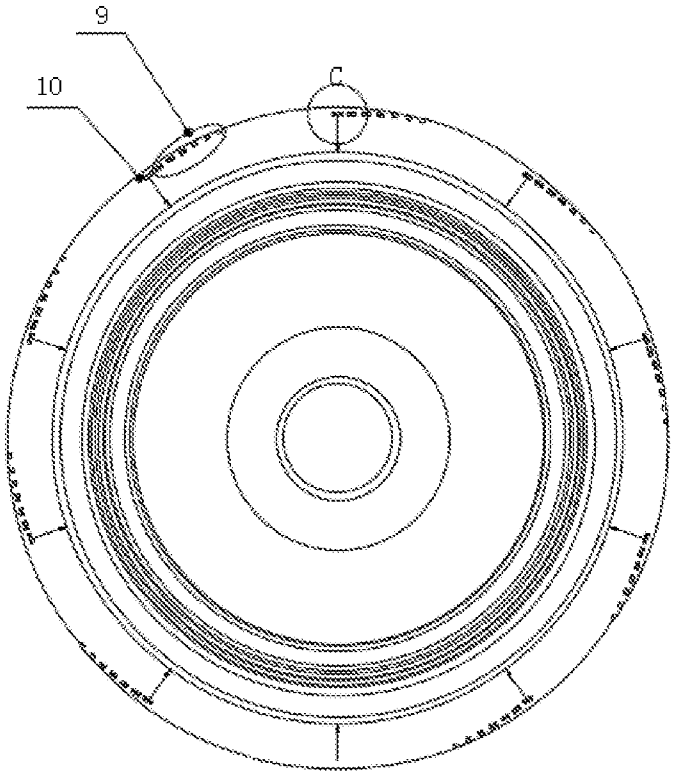
FIG. 4 illustrates a schematic diagram of a spraying state of a cooling medium on a winding at a stator end of the Embodiment 1 of the present disclosure.
Figure 5:
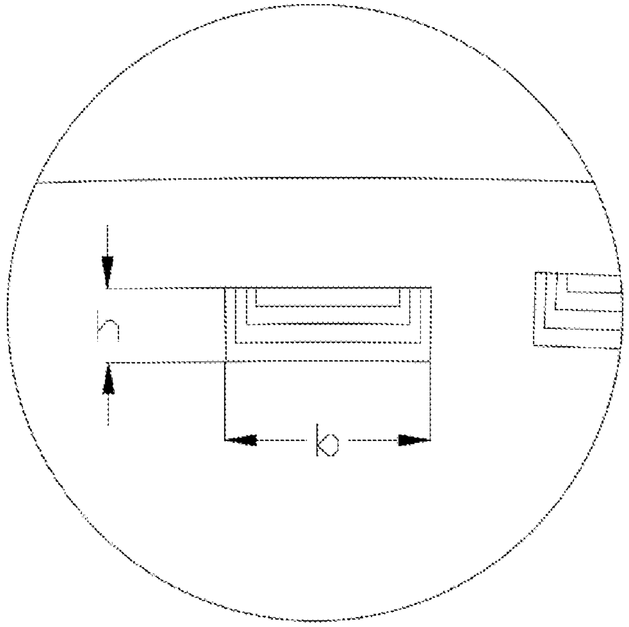
FIG. 5 illustrates an enlarged schematic structural diagram of part C in FIG. 4.
Figure 6:
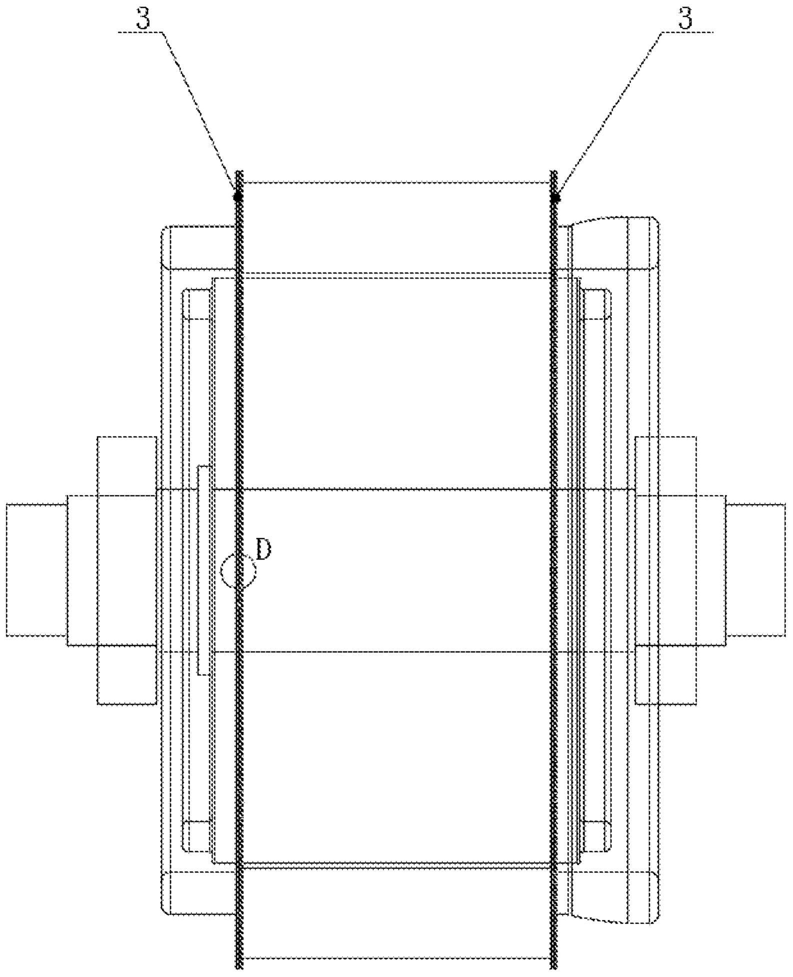
FIG. 6 illustrates a schematic diagram of another view of a spraying state of a cooling medium on a winding at a stator end of the Embodiment 1 of the present disclosure.
Figure 7:
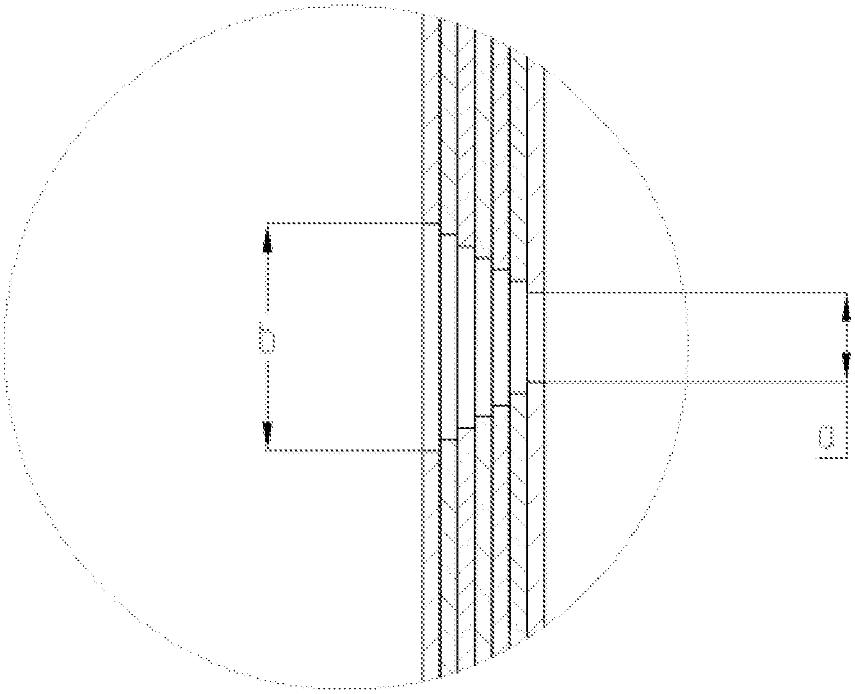
FIG. 7 illustrates an enlarged schematic structural diagram of part D of FIG. 6.
Figure 15:
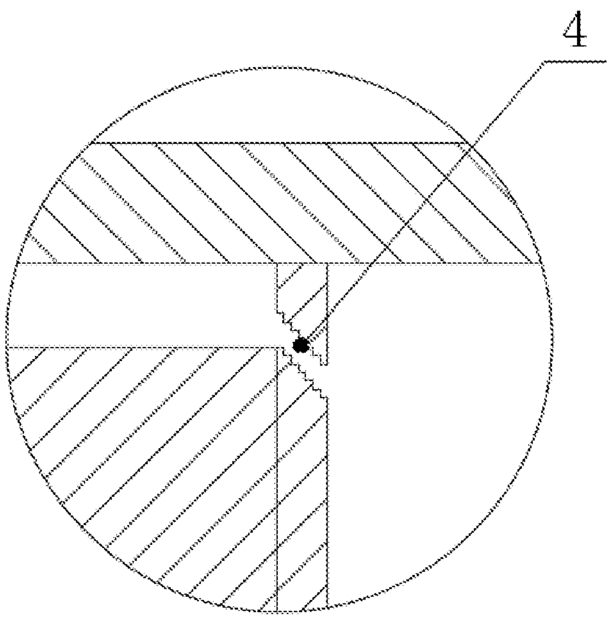
FIG. 15 illustrates a schematic structural diagram of an oil outlet end of an oil spray channel when located on one side, close to a stator end winding, of a heat dissipation oil way of a stator core of the Embodiment 1 of the present disclosure.

In some embodiments, the oil inlet end of the oil spray channel 4 can be located at a side surface of one end of the oil spray part 3 which is close to the case 1 of the motor. At this moment, the oil outlet end of the oil spray channel 4 is located in a space extending from the cooling medium flow chamber 5 towards the chamber inside the motor. As shown in FIG. 1A, alternatively, the oil inlet end of the oil spray channel 4 is located at the side surface of the oil spray part 3 which is close to the stator core 2. At this moment, the oil outlet end of the oil spray channel 4 is located at one side (one side close to the stator end winding 6) of the cooling medium flow chamber 5, as shown in FIG. 15.

In order to simplify a heat dissipation structure and reduce the occupation of the space inside the case 1 of the motor, in this embodiment, the case 1 located at an upper part of the motor is provided with an oil inlet 7. The oil inlet 7 is communicated with the cooling medium flow chamber 5. The case 1 located at a lower part of the motor is provided with an oil outlet 8. The oil outlet 8 is communicated with the chamber inside the motor, so that the cooling medium enters the cooling medium flow chamber 5 from the oil inlet 7 in the upper part of the case 1, the cooling medium is sprayed from the oil spray channel 4 while flowing in the cooling medium flow chamber 5 and sprayed onto the stator end winding 6. The cooling medium flows through the inner surface of the stator winding under the action of gravity and converges at the lower part of the case 1, and flows out from the oil outlet 8 at the lower part of the case 1. Through such structural design, an oil pipe and an oil pipe connector in the existing design are omitted, so that the heat dissipation structure is simple and a mounting process is simplified. The cooling medium enters from the oil inlet 7 and is sprayed out from the oil spray channel 4, so that heat dissipation of the stator core 2 and heat dissipation of a stator end winding 6 are connected by using a series oil way. Each part is subjected to heat dissipation by using a maximum flow rate of the cooling medium, the utilization rate of the cooling medium is greater. All surfaces can be in contact with the oil to achieve an effect of dissipating heat, and the heat dissipation performance of the motor is improved.

As shown in FIGS. 1A to 1D, the oil spray channel 4 includes a plurality of oil spray holes 40. The plurality of oil spray holes 40 are sequentially arranged along one side surface facing the stator core 2 of the oil spray part 3 to the other side surface; and there is a distance between axes of the adjacent oil spray holes 40, so that the plurality of oil spray holes 40 are arranged in an inclined direction. The oil spray channel 4 is formed by sequentially connecting the plurality of oil spray holes 40. When the plurality of oil spray holes 40 are connected and arranged, they are sequentially arranged in an inclined manner along one side surface facing the stator core 2 of the oil spray part 3 to the other side surface. The plurality of oil spray holes 40 are communicated with one another to construct the oil spray channel 4 arranged in an inclined manner, so that the cooling medium can be sprayed to the stator end winding 6.

The distance between the axes of the adjacent oil spray holes 40 is greater than 0, which is selected according to actual demand. In this embodiment, the distance between the axes of the adjacent oil spray holes 40 is greater than 0, so that the oil spray channel 4 is of a hole structure with a stepped inner wall.

The axes of the plurality of oil spray holes 40 can intersect with each other, or, the axes of the plurality of oil spray holes 40 are parallel to each other, or the axes of one part oil spray holes 40 are parallel to each other and the axes of the other part oil spray holes 40 intersect with each other, which is selected according to actual demand, and there are no specific requirements here. In order to reduce the difficulty of a preparation process and improve the processing efficiency, preferably, in this embodiment, the axes of the plurality of oil spray holes 40 are parallel to each other, the axis of each oil spray hole 40 is parallel to the axis of the stator core 2, and the axes of two adjacent oil spray holes 40 are parallel to each other, then the axes of the plurality of oil spray holes 40 are parallel to each other, and there is a certain distance between the axes of the two adjacent oil spray holes 40, so that the plurality of oil spray holes 40 are arranged in an inclined manner, and the oil spray channels 4 are arranged in an inclined manner. The distance is determined according to an actual inclination angle of the oil spray channel 4, and there are no specific requirements here.

Since the oil spray channels 4 are arranged in an inclined manner, then the distances between the axes of the plurality of oil spray holes 40 and the axis of the stator core 2 are mostly different, so that the whole oil spray channel 4 is in an inclined manner. In this embodiment, preferably, the distance between the axes of the plurality of oil spray holes 40 and the axis of the stator core 2 are sequentially decreased and are set in a stepped manner, so that the oil spray channel 4 is inclined from one side facing the stator core 2 of the oil spray part 3 to the direction of the stator end winding 6, and the cooling medium can be directly sprayed onto the stator end winding 6.

The sectional shape of the oil spray hole 40 can be circular, or square, or elliptical, or rhombic, or other shapes, which is selected according to actual demand. There are no specific requirements here.

As shown in FIGS. 4 to 7, each oil spray hole 40 has a certain width (the width of the oil spray hole 40 is perpendicular to a direction from an oil inlet end to an oil outlet end of the oil spray channel 4). The widths of the plurality of oil spray holes 40 can be the same or can be different, or the widths of part oil spray holes 40 are the same and the widths of part oil spray holes 40 are different, which is selected according to actual demand. There are no specific requirements here. Each oil spray hole 40 has a certain height, the height of the oil spray hole 40 is perpendicular to the width of the oil spray hole 40. The height and the width of the oil spray hole 40 are main dimensions forming a cross section of the oil spray hole 40. The heights of the plurality of oil spray holes 40 can be the same or can be different, or the heights of part oil spray holes 40 are the same, and the heights of part oil spray holes 40 are different, which is selected according to actual demand. There are no specific requirements here.

Preferably, in this embodiment, in the direction from the oil inlet end to the oil outlet end of the oil spray channel 4, the widths of the plurality of oil spray holes 40 in the circumferential direction of the stator core 2 are gradually increased, so that the width of the cross section of the oil spray channel 4 is gradually increased. Therefore, the cooling medium is sprayed in a fan-shaped state, and can be sprayed onto the stator end winding 6 with a larger area.

The width of one side of the oil inlet end of the oil spray channel 4 is the smallest and the width of the side is set as a, and the width of one side of the oil outlet end of the oil spray channel 4 is the largest and the width of the side is set as b, then $b>a$. The size ratio of a to b is selected and set according to data, such as motor structure size and cooling medium flow rate. There are no specific requirements here.

The height of each oil spray hole 40 is set as h, since the plurality of oil spray holes 40 are arranged in an inclined manner, there is a height difference between adjacent oil spray holes 40. From the side of the oil outlet end of the oil spray channel 4, part of adjacent oil spray holes 40 can be displayed.

Or, in the direction from the oil inlet end to the oil outlet end of the oil spray channel 4, the widths of the plurality of oil spray holes 40 in the circumferential direction of the stator core 2 are the same, so that the width of the cross section of the oil spray channel 4 is unchanged, and the cooling medium is sprayed in a cylindrical state, and can be rapidly and accurately sprayed onto the stator end winding 6.

The direction in which the cooling medium is sprayed out at the oil outlet end of the oil spray channel 4 points to the stator end winding 6, and the axes of the oil spray channel 4 and the stator core 2 intersect and form a predetermined angle α, and the predetermined angle α satisfies the following relational expression:

$$0<\alpha<\arctan(L/H)$$

L is the length of the stator end winding 6, and H is a distance from the oil outlet of the oil spray channel 4 to the stator end winding 6. The predetermined angle α is selected according to L and H.

As a further optimization solution, as shown in FIGS. 1A to 1D, the oil spray channel 4 further includes a first oil spray holes 41. The first oil spray holes 41 are arranged at any end of the plurality of oil spray holes 40, or the first oil spray holes 41 are arranged at both ends of the plurality of oil spray holes 40. That is, the first oil spray holes 41 are formed in the oil inlet end or the oil outlet end of the oil spray channel 4, or the first oil spray holes 41 are formed in either the oil inlet end or the oil outlet end of the oil spray channel 4, which is selected according to actual demand. There are no specific requirements here. In an axis direction of the stator core 2, the length of the first oil spray hole 41 is greater than the length of any oil spray hole of the plurality of oil spray holes 40. The length of the first oil spray hole 41 is the greatest among the plurality of oil spray holes 40, so that the sectional shapes of the oil inlet end and/or the oil outlet end of the oil spray channel 4 have platform structures arranged oppositely, so that the cooling medium can stably flow into the oil spray channel 4 or stably flow out of the oil spray channel 4.

Figure 16:
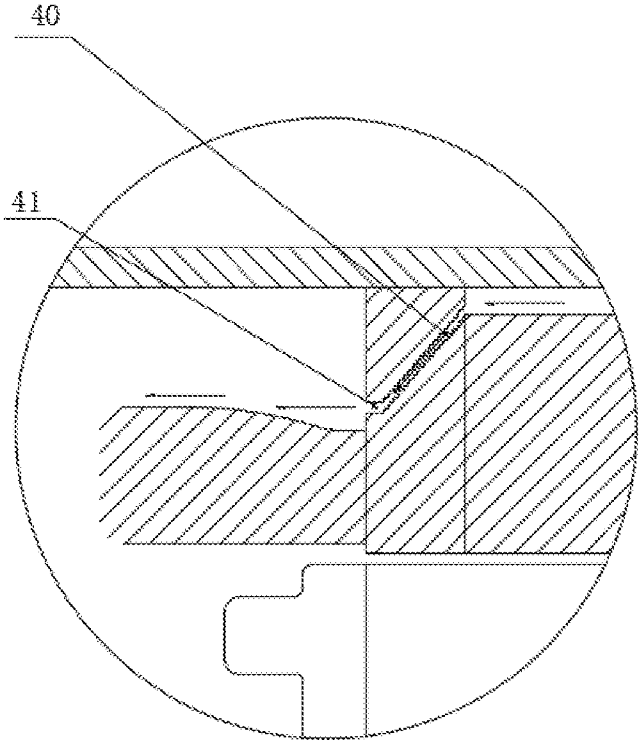
FIG. 16 illustrates a schematic diagram of a flowing state of a cooling medium when an oil outlet end of an oil spray channel is provided with a first oil spray hole of the Embodiment 1 of the present disclosure.

The axes of the first oil spray holes 41 are parallel to the axis of the stator core 2. When the first oil spray holes 41 are located at the oil inlet end of the oil spray channel 4, the arrangement of the first oil spray holes 41 facilitates smooth entrance of the cooling medium into the oil spray channel 4. When the first oil spray holes 41 are located at the oil outlet end of the oil spray channel, or when the first oil spray holes 41 are located at the oil inlet end and the oil outlet end, at this moment, the cooling medium is directly sprayed out from the first oil spray holes 41 relatively parallel to the stator end winding 6, as shown in FIG. 16, and then is sprayed onto the stator end winding 6 under the action of gravity. At this moment, the predetermined angle between the axis of the oil spray channel 4 and the axis of the stator core 2 cannot be limited by using the above formula. In this case, the predetermined angle between the axis of the oil spray channel 4 and the stator core 2 can be selected and set according to actual demand.

In order to arrange the plurality of oil spray holes 40 of the oil spray channel 4 in a stepped manner, the oil spray part 3 includes a plurality of silicon steel sheets 30 of at least one type, as shown in FIGS. 6 to 9, the material of the silicon steel sheet 30 is consistent with the material of the silicon steel sheet forming the stator core 2. The plurality of silicon steel sheets 30 are all coaxially arranged with the stator core 2, so as to mount the oil spray parts 3 at both ends of the stator core 2 without hindering the rotation of a rotor of the motor. The silicon steel sheets in each oil spray part 3 can be of the same type or can be different types. The type of the silicon steel sheet is selected according to actual demand.

In order to mount the silicon steel sheets 30 at both ends of the stator core 2, in this embodiment, the silicon steel sheet 30 is of an annular structure. A plurality of stator slots 301 are arranged on a side which is close to an inside diameter end of the silicon steel sheet 30 in a circumferential direction; and the plurality of stator slots 301 are in one-to-one correspondence with slots of the stator core 2, so as to facilitate the arrangement of a stator winding. In addition, the oil spray part 3 cannot hinder the mounting the stator winding, and the plurality of silicon steel sheets 30 are overlapped to form the structure of the oil spray part 3.

Figure 17:
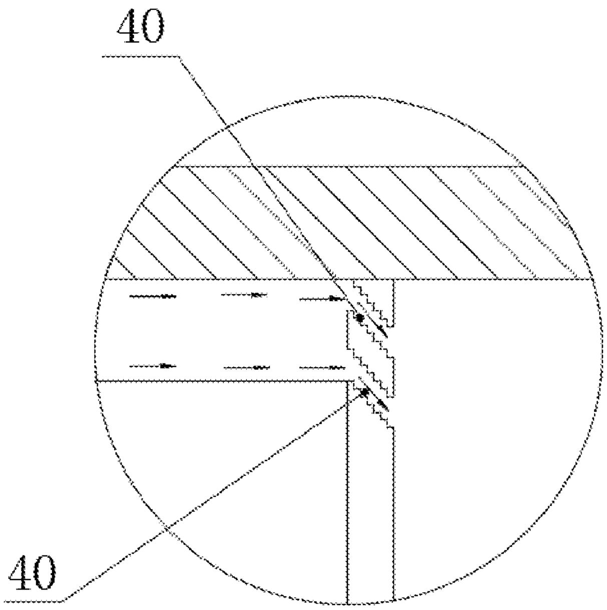
FIG. 17 illustrates a schematic diagram of a local structure when oil spray channels are arranged in two rows of the Embodiment 1 of the present disclosure.

The structure of one type of silicon steel sheet is: one side which is close to an outside diameter end of each silicon steel sheet 30 is provided with a plurality of oil spray holes 40; the plurality of oil spray holes 40 are arranged in the circumferential direction of the silicon steel sheet 30; the plurality of oil spray holes 40 are at least formed in an upper half part of the silicon steel sheet 30 which is arranged inside the motor; the position of each oil spray hole 40 corresponds to the position of each oil spray channel 4; the plurality of oil spray holes 40 are located at the positions corresponding to the upper half part of the stator core 2 of the silicon steel sheet 30; or the plurality of oil spray holes 40 are located on the whole circumferential direction of the silicon steel sheet 30, which is selected according to actual demand, and there are no specific requirements here. As shown in FIG. 17, the plurality of oil spray holes 40 are arranged in at least one row in a radial direction of the silicon steel sheet 30. The plurality of oil spray holes 40 arranged in the same circumferential direction are in one row, then, in a radial direction of the silicon steel sheet 30, the plurality of oil spray holes 40 are arranged on one row, or the plurality of oil spray holes 40 are arranged in two rows, or the plurality of oil spray holes 40 are arranged in a plurality of rows, which is selected according to actual demand. The distances from the oil spray holes 40 in different silicon steel sheets 30 to the axis of the stator core 2 are different. The distances from the plurality of oil spray holes 40 in the same row of each silicon steel sheet 30 to the axis of the stator core 2 are the same; and the positions of the oil spray holes 40 in the plurality of silicon steel sheets 30 are in one-to-one correspondence, so as to construct a structure of an oil spray channel 4. When the plurality of silicon steel sheets 30 are overlapped, the corresponding oil spray hole 40 at each position corresponds first, and corresponding silicon steel sheets 30 are sequentially overlapped according to a trend that the distances between the axes of the oil spray holes 40 and axis of the stator core 2 is gradually decreased, so that each oil spray hole 40 forms an oil spray channel 4, and the distances between axes of the oil spray holes 40 at the corresponding positions of each silicon steel sheet 30 and the axis to the stator core 2 are different, then an oil spray channel 4 is formed by a plurality of oil spray holes 40 arranged in a stepped manner at each corresponding position of the plurality of silicon steel sheets 30. The widths of the oil spray holes 40 of each silicon steel sheet 30 can be different, so that the width of the oil inlet end of the constructed oil spray channel 4 is small, the width of the oil outlet end is large, and the cooling medium is sprayed in a fan-shaped state. Or, the widths of the oil spray holes 40 of each silicon steel sheet 30 can be the same, so that the width of the constructed oil spray channel 4 is consistent from the oil inlet end to the oil outlet direction, and the cooling medium is sprayed in a cylindrical state.

Figure 8:
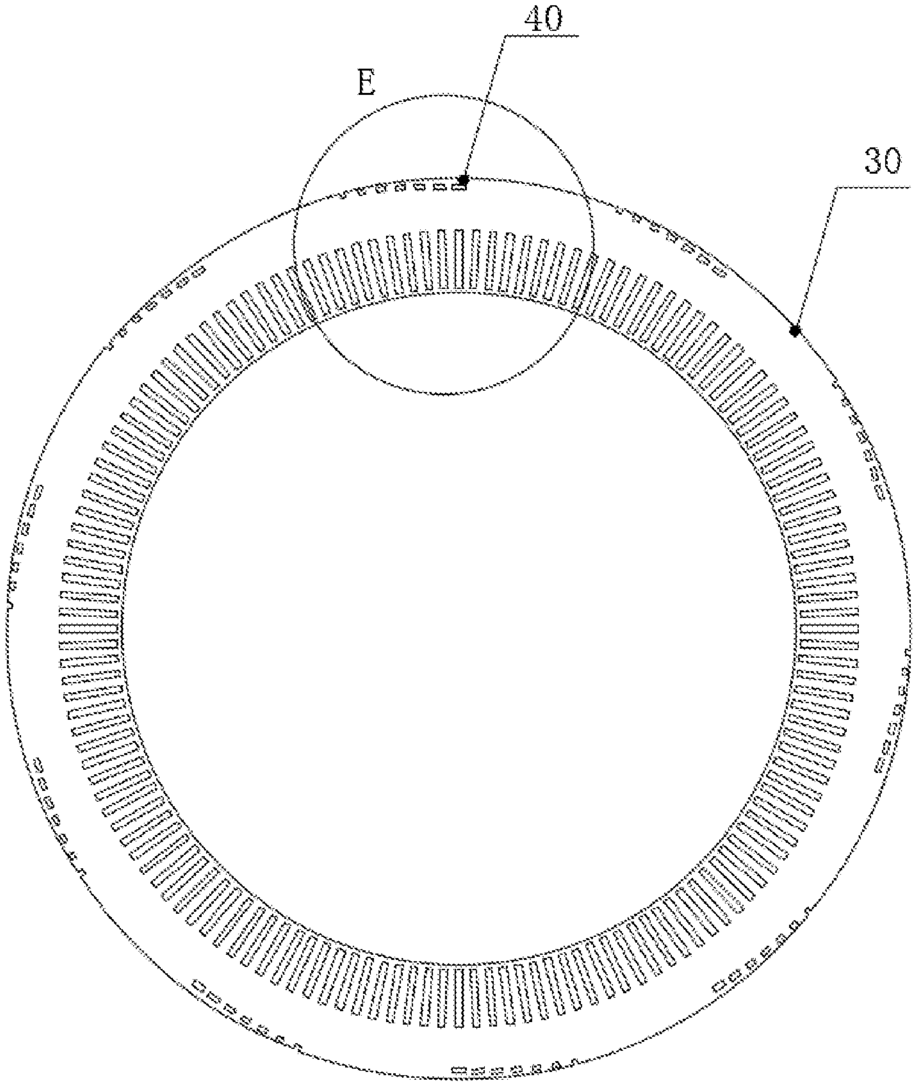
FIG. 8 illustrates a schematic structural diagram of a single silicon steel sheet with oil spray hole group of the Embodiment 1 of the present disclosure.
Figure 9:
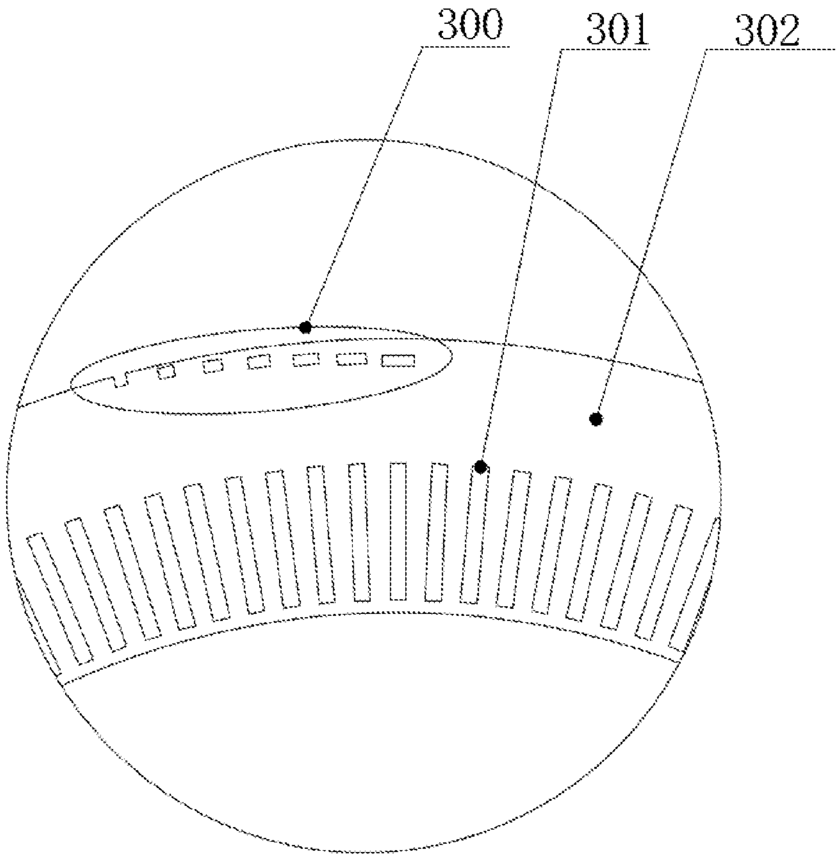
FIG. 9 illustrates an enlarged schematic structural diagram of part E in FIG. 8.
Figure 18:
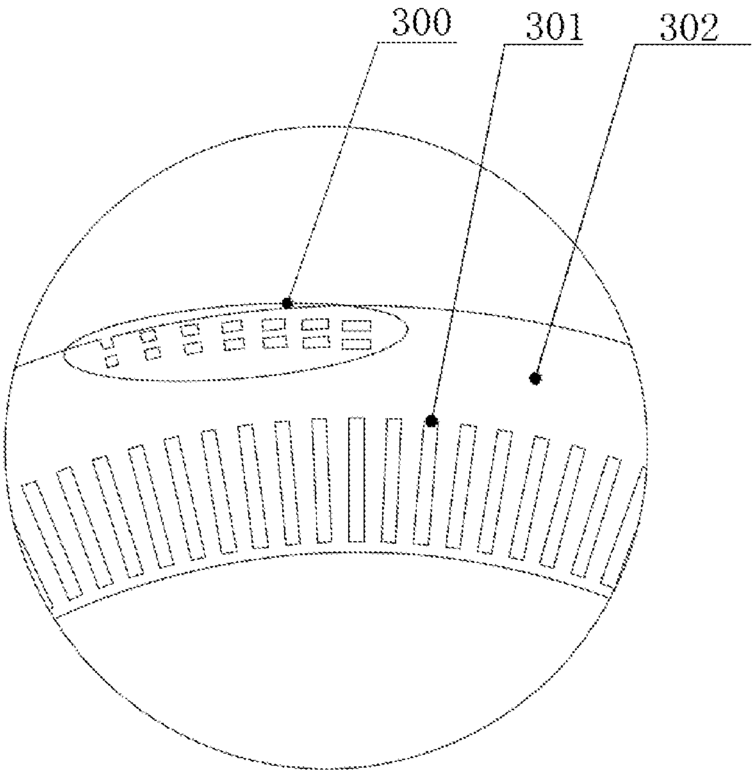
FIG. 18 illustrates a schematic diagram of a local structure when a plurality of groups of oil spray holes is arranged in two rows of the Embodiment 1 of the present disclosure.
Figure 19:
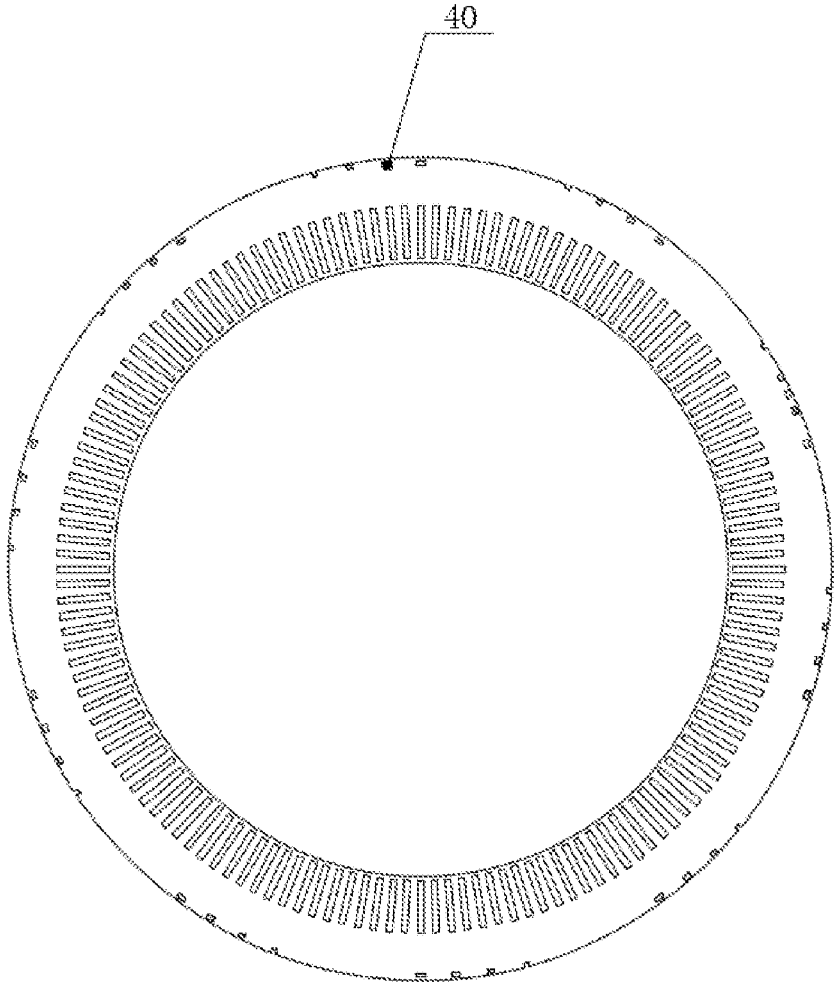
FIG. 19 illustrates a schematic structural diagram when there is a stator slot between two adjacent oil spray holes in each group of oil spray holes of the Embodiment 1 of the present disclosure.

Or, the structure of another type of silicon steel sheet is: as shown in FIGS. 8 and 9, one side which is close to the outside diameter end of each silicon steel sheet 30 is provided with a multiple groups oil spray holes 40; the multiple groups oil spray holes 40 are arranged in the circumferential direction of the silicon steel sheet 30; the multiple groups oil spray holes 40 are at least formed in an upper half part of the silicon steel sheet 30 when arranged inside the motor, and are formed in the positions corresponding to the upper half part of the stator core 2 of the silicon steel sheet 30; in the circumferential direction, multiple groups oil spray holes 40 are arranged, or in the whole circumferential direction of the silicon steel sheet 30, multiple groups oil spray holes 40 are arranged, which is selected according to actual demand, and there are no specific requirements here. As shown in FIG. 18, multiple groups oil spray holes 40 are arranged in at least one row in a radial direction of the silicon steel sheet 30. The multiple groups oil spray holes 40 arranged in the same circumferential direction are in one row, then in a radial direction of the silicon steel sheet 30, the multiple groups oil spray holes 40 can be arranged in one row, or the multiple groups oil spray holes 40 can be arranged in two rows, or the multiple groups oil spray holes 40 can be arranged in a plurality of rows, which is selected and set according to actual demand. In each group of oil spray holes 40, the multiple groups oil spray holes 40 are sequentially arranged in the circumferential direction of the silicon steel sheet 30, and the distance from each oil spray hole 40 to the axis of the stator core 2 is different. In each group of oil spray holes 40, the distances from the oil spray holes 40 to the axis of the stator core 2 are sequentially increased or sequentially decreased. In each group of oil spray holes 40, each oil spray hole 40 corresponds to one stator slot 301, so as to facilitate positioning when the plurality of silicon steel sheets 30 are overlapped. During mounting, the plurality of silicon steel sheets are sequentially arranged in a manner that a first silicon steel sheet 30 is taken as a basis, a Nth silicon steel sheet 30 is arranged in a manner of rotating by an angle of (N−1)×(M+1) stator slot 301 relative to the first silicon steel sheet 30 to construct the oil spray channel 4. Herein M is a number of stator slots in front of the two adjacent oil spray holes. For example, when there is no stator slot 301 between two adjacent oil spray holes 40, and when the second silicon steel sheet 30 is mounted, the multiple groups oil spray holes 40 of a second silicon steel sheet 30 are in one-to-one correspondence with the plurality of oil spray holes 40 of the first silicon steel sheet 30, and then, an angle of stator slot 301 is rotated, so that the second oil spray hole 40 of the second silicon steel sheet 30 corresponds to and is communicated with the first oil spray hole 40 of the first silicon steel sheet 30. When a third silicon steel sheet 30 is mounted, each group of oil spray holes 40 of the third silicon steel sheet 30 correspond to each group of oil spray holes 40 of the first silicon steel sheet 30, then the third silicon steel sheet 30 is rotated by an angle of two stator slots 301, so that the third oil spray hole 40 of the third silicon steel sheet 30 corresponds to and is communicated with the first oil spray hole 40 of the first silicon steel sheet 30, and by analogy, until the last silicon steel sheet 30 is mounted. For another example, as shown in FIG. 19, when there is a stator slot 301 between the two adjacent oil spray holes 40, and when the second silicon steel sheet 30 is mounted, the plurality of groups of oil spray holes 40 of the second silicon steel sheet 30 are in one-to-one correspondence with the plurality of oil spray holes 40 of the first silicon steel sheet 30, and then, an angle of two stator slots 301 is rotated, so that the second oil spray hole 40 of the second silicon steel sheet 30 corresponds to and is communicated with the first oil spray hole 40 of the first silicon steel sheet 30. When the third silicon steel sheet 30 is mounted, each group of oil spray holes 40 of the third silicon steel sheet 30 correspond to each group of oil spray holes 40 of the first silicon steel sheet 30, then the third silicon steel sheet 30 is rotated by an angle of four stator slots 301, so that the third oil spray hole 40 of the third silicon steel sheet 30 corresponds to and is communicated with the first oil spray hole 40 of the first silicon steel sheet 30, and so on, until the last silicon steel sheet 30 is mounted. At this moment, in all silicon steel sheets 30, only the first oil spray hole 40 of the first silicon steel sheet 30 is communicated with the corresponding oil spray hole 40, and the others are not communicated. That is, in each group of oil spray holes 40, only one oil spray hole 40 is an effective hole, and the others are ineffective holes. When all silicon steel sheets 30 are mounted, the rotation directions are consistent, so that the oil spray holes 40 in the constructed oil spray channel 4 are arranged in a stepped manner.

In each silicon steel sheet 30, there is a blank area 302 between two adjacent groups of oil spray holes 40. The ineffective hole 9 is blocked by the blank area 302, and the size of the blank area 302 is determined according to the size of each group of oil spray holes 40 and the number of groups of the oil spray holes 40. In this embodiment, the selection of the oil spray holes 40 of the first silicon steel sheet 30 determines the selection of the oil spray holes 40 of other subsequent silicon steel sheets 30. Any oil spray hole 40 in each group of the first silicon steel sheet 30 can be selected as the effective hole 10, which is selected according to actual mounting demand. There are no specific requirements here.

As a further optimization solution, in order to increase the heat dissipation area of the stator core 2, a plurality of heat sinks 11 are arranged on an outer surface of the stator core 2. As shown in FIGS. 10 to 13, the plurality of heat sinks 11 are arranged in the circumferential direction of the stator core 2, which increases the flow speed of a cooling medium, so that the cooling medium that flows on the surface of the stator core 2 changes from laminar flow into turbulent flow, thereby improving the heat dissipation performance of the motor. The heat sinks 11 are fixedly connected with the stator core 2, and preferably, a fixed connection manner is integrated forming.

Whether the heat sinks 11 are arranged is determined by a mounting structure of a stator of the motor, and parameters such as the loss of the motor. When the outer surface of the stator core 2 is not provided with the heat sinks 11, at this moment, the outside diameter of an oil spray part 3 is greater than the outside diameter of the stator core 2. The oil spray parts 3 protrude from the outer surface of the stator core 2, so that the outer surface of the stator core 2, a case 1 and the oil spray parts 3 construct the cooling medium flow chamber 5. When the outer surface of the stator core 2 is not provided with the heat sinks 11, at this moment, the outside diameter of the oil spray part 3 can be greater than the outside diameter of the stator core 2, an outside diameter of the oil spray part 3 protrudes from the outer surfaces of the heat sinks 11. The outer surface of the stator core 2, the case 1 and the oil spray parts 3 construct the cooling medium flow chamber 5, and the heat sinks 11 are located in the cooling medium flow chamber 5. When the outer surfaces of the heat sinks 11 are in contact with the inner surface of the case 1, at this moment, the outside diameter of the oil spray part 3 is flush with the outer surfaces of the heat sinks 11. The heat sinks 11 are located inside the cooling medium flow chamber 5 to divide the cooling medium flow chamber 5 into a plurality of flow channels that are communicated with one another, so as to facilitate flowing of a cooling medium.

Figure 10:
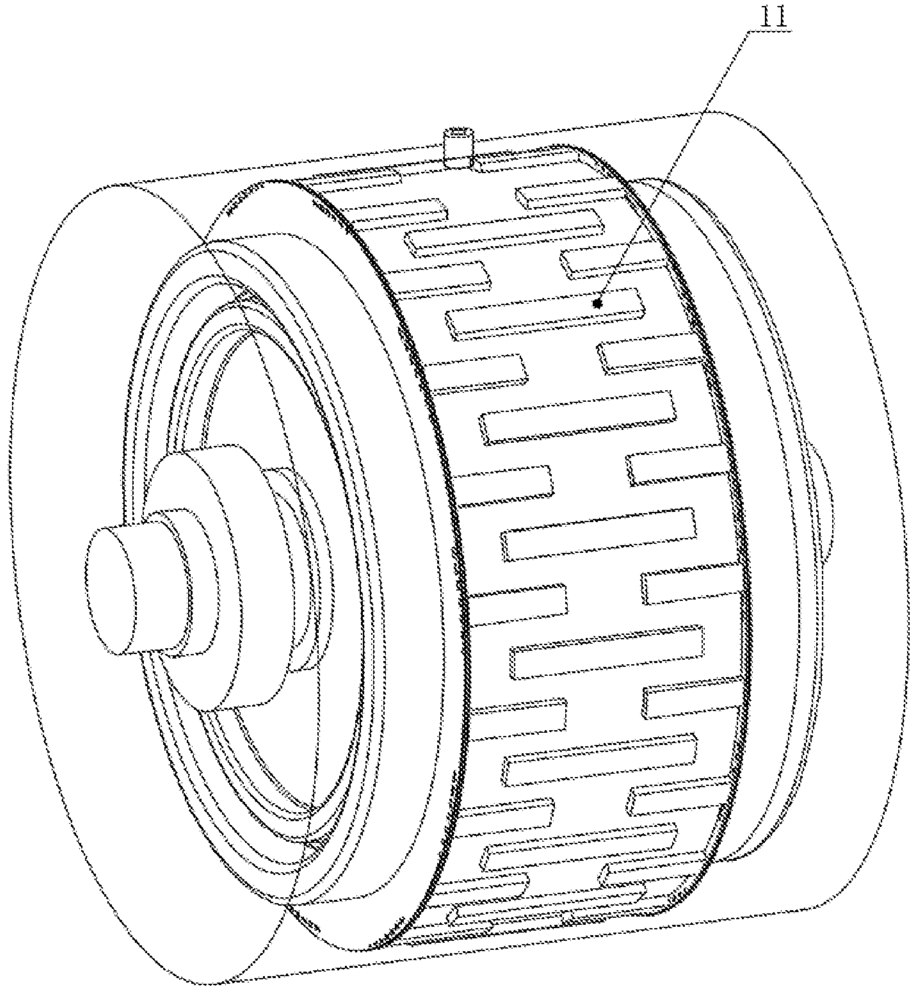
FIG. 10 illustrates a first schematic structural diagram of an arrangement of a heat sink of the Embodiment 1 of the present disclosure.

As shown in FIG. 10, the plurality of heat sinks 11 is arranged in multiple groups. The multiple groups heat sinks 11 are sequentially arranged in the circumferential direction of the stator core 2, and are distributed throughout the outer surface of the stator core 2 to block the cooling medium that flows on the outer surface of the stator core 2 to change the flowing state of the cooling medium. Each of the multiple groups heat sinks 11 are arranged on the outer surface of the stator core 2 at a certain distance. Each of the multiple groups heat sinks 11 include a first blocking rod, a second blocking rod and a third blocking rod. The first blocking rod, the second blocking rod and the third blocking rod are all arranged in the axis direction of the stator core 2, that is, the first blocking rod, the second blocking rod and the third blocking rod are all arranged in a length direction of the stator core 2, and the first blocking rod and the second blocking rod are arranged in the same straight line, and there is a gap between the first blocking rod and the second blocking rod. One end of the first blocking rod is flush with one end of the stator core 2 and extends to the direction of the other end. One end of the second blocking rod is flush with the other end of the stator core 2 and extends to the direction of one end. The sum of the lengths of the first blocking rod and the second blocking rod is less than the length of the stator core 2, so that there is a gap between the first blocking rod and the second blocking rod, thereby facilitating passage of the cooling medium through the gap. The third blocking rod is arranged at any side of the first blocking rod, the third blocking rod corresponds to the position of the gap between the first blocking rod and the second blocking rod, and the length of the third blocking rod is not less than the length of the gap, so that the third blocking rod blocks the cooling medium to divide the cooling medium into two parts, which flow out from the two ends of the third blocking rod. The plurality of heat sinks 11 is sequentially arranged. The cooling medium flows out from the gap between the first blocking rod and the second blocking rod in a first group and is divided into two parts through the blockage of the third blocking rod, which respectively flow out from the two ends of the third blocking rod. The cooling medium flows out from the gap between the first blocking rod and the second blocking rod in a second group again, and is blocked by the third blocking rod again to be divided into two parts and flows into the next group, by analogy, the cooling medium flows through the whole outer surface of the stator core 2. Meanwhile, the cooling medium flows out from the oil spray channels 4 at the two ends of the stator core 2 while flowing on the surface of the stator core 2, and is sprayed to the stator end winding 6.

Preferably, in this embodiment, the first blocking rod and the second blocking rod are arranged in parallel, and the first blocking rod, the second blocking rod and the third blocking rod are all parallel to the axis of the stator core 2.

Figure 11:
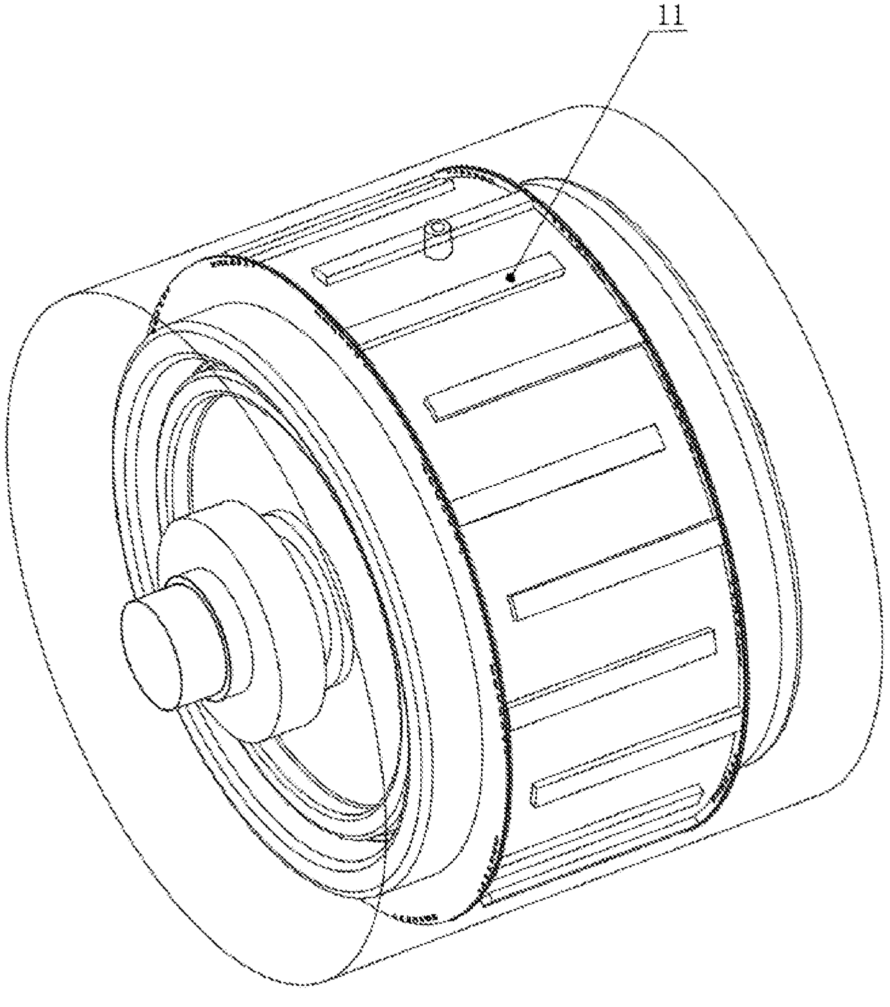
FIG. 11 illustrates a second schematic structural diagram of an arrangement of a heat sink of the Embodiment 1 of the present disclosure.

Or, as shown in FIG. 11, the length of the heat sink 11 is less than the length of the stator core 2, and a plurality of heat sinks 11 are arranged in an S-shape. In the plurality of heat sinks 11, one end of a heat sink 11 is flush with one end of the stator core 2 and extends to the direction of the other end. One end of a second heat sink 11 is flush with the other end of the stator core 2 and extends to the direction of the other end. One end of a third heat sink 11 is flush with one end of the stator core 2 and extends to the direction of the other end. One end of a fourth heat sink 11 is flush with the other end of the stator core 2 and extends to the direction of the other end. By analogy, one end of each of two adjacent heat sinks 11 is flush with one end of the stator core 2, and one end of the other heat sink 11 is flush with the other end of the stator core 2. The two heat sinks 11 extend opposite to each other, and are arranged in an S-shaped, so that the cooling medium flows in an S-shaped.

Figure 12:
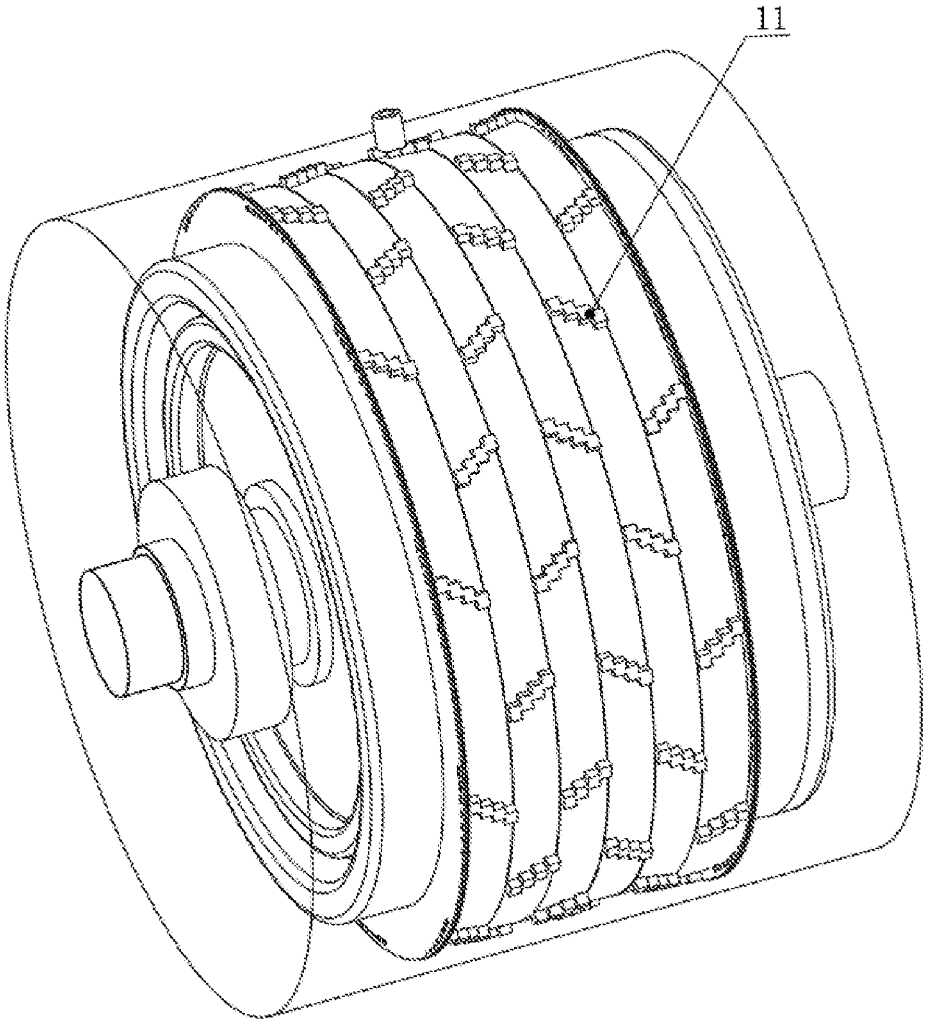
FIG. 12 illustrates a third schematic structural diagram of an arrangement of a heat sink of the Embodiment 1 of the present disclosure.

Or, as shown in FIG. 12, the plurality of heat sinks 11 are arranged in multiple groups; the multiple groups heat sinks 11 are sequentially arranged in the axis direction of the stator core 2; and the number of groups is selected and set according to actual demand. Each of the multiple groups heat sinks 11 are arranged in the circumferential direction of the stator core 2, and each heat sink 11 intersects the axis of the stator core 2; and the heat sinks 11 in adjacent two groups are arranged in a staggered manner. The plurality of heat sinks 11 in each group are all arranged in an inclined manner, and the inclination directions are consistent. Two side surfaces of each heat sink 11 are arranged in a stepped manner, so that the cooling medium that flows through the heat sinks 11 flow in a turbulent state. In the axis direction of the stator core 2, the outer surface of the stator core 2 is arranged in a plurality of heat dissipation areas; the plurality of groups of heat sinks 11 are arranged in each of the heat dissipation areas. First inclination directions of the heat sinks 11 in two groups on both sides of the heat dissipation area are consistent; Second inclination directions of the heat sinks 11 in the remaining groups except the two groups on both sides are consistent, and the second inclination directions of the heat sinks 11 in the remaining groups and the first inclination directions of the heat sinks 11 in the two groups on both sides of the heat dissipation area are arranged symmetrically. There is a plurality of groups of heat sinks 11 in each heat dissipation area. The inclination directions of the two groups of heat sinks 11 at the edge of each heat dissipation area are consistent. The inclination directions of the plurality of groups of heat sinks 11 located inside the two edges are consistent, and the inclination directions of the heat sinks 11 in the groups at the edges are arranged symmetrically.

Due to the arrangement of the multiple groups heat sinks 11, the cooling medium is separated into a plurality of flow directions to flow through one heat sink 11 to form a turbulent flow behind the heat sink 11. The cooling medium is changed from a laminar state into a turbulent state, so that the cooling media are mixed after being separated, and the cooling media at different temperatures are mixed, which improves the heat dissipation performance of the motor.

The number of the heat sinks 11 in each group and the distance between adjacent heat sinks 11 are selected and set according to actual demand. There are no specific requirements here.

Figure 13:
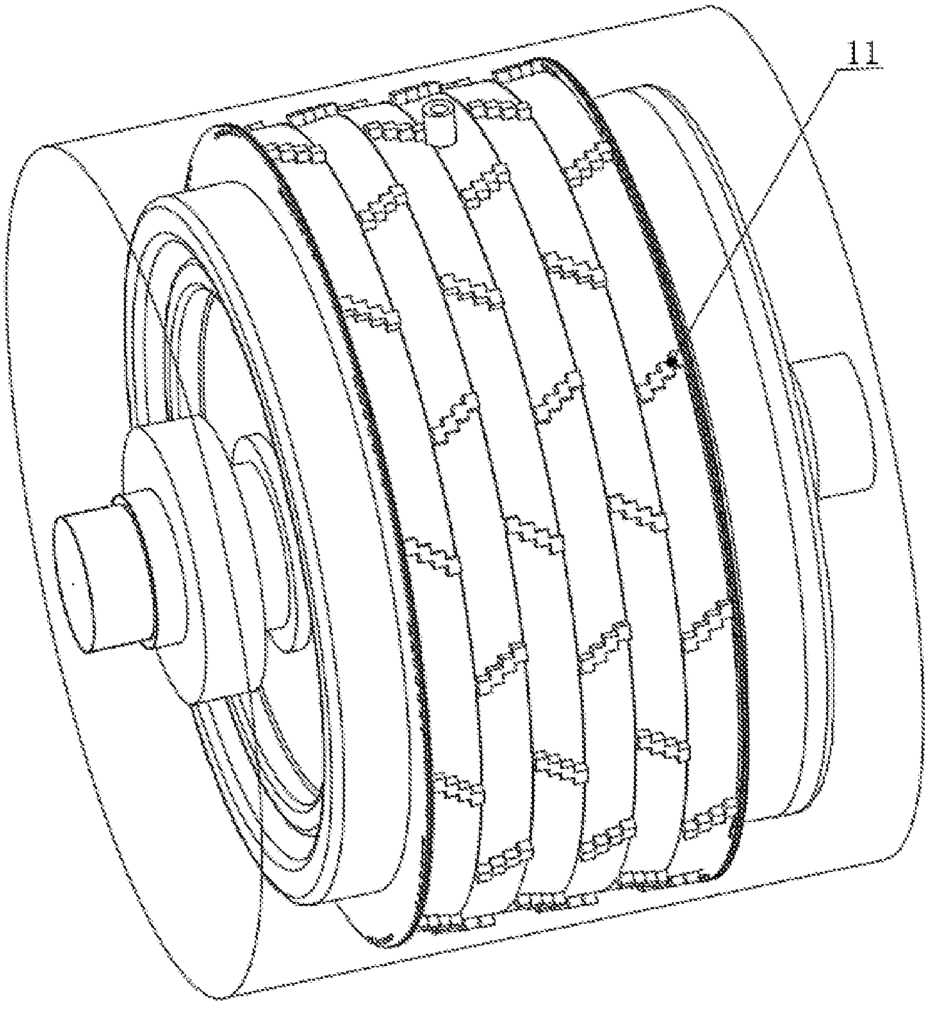
FIG. 13 illustrates a fourth schematic structural diagram of an arrangement of a heat sink of the Embodiment 1 of the present disclosure.

Or, as shown in FIG. 13, the plurality of heat sinks 11 is arranged in multiple groups. The multiple groups heat sinks 11 are sequentially arranged in the axial direction of the stator core 2. Each of multiple groups heat sinks 11 are arranged in the circumferential direction of the stator core 2. Each heat sink 11 intersects the axis of the stator core 2. The heat sinks 11 in two adjacent groups are arranged in a staggered manner. The inclination directions of the heat sinks 11 in the two adjacent groups are arranged symmetrically. The number of groups of the heat sinks 11 is set according to actual demand. Two side surfaces of each heat sink 11 are arranged in a stepped manner, so that the flowing speed of the cooling medium that flows through the heat sink 11 is increased. Due to the arrangement of the heat sinks 11, the cooling medium is divided into a plurality of flow directions to flow through one heat sink 11 to form a turbulent flow behind the heat sink 11. The cooling medium is changed from a laminar state into a turbulent state, so that the cooling media are mixed after being separated, and the cooling media at different temperatures are mixed, which improves the heat dissipation performance of the motor.

Figure 14:
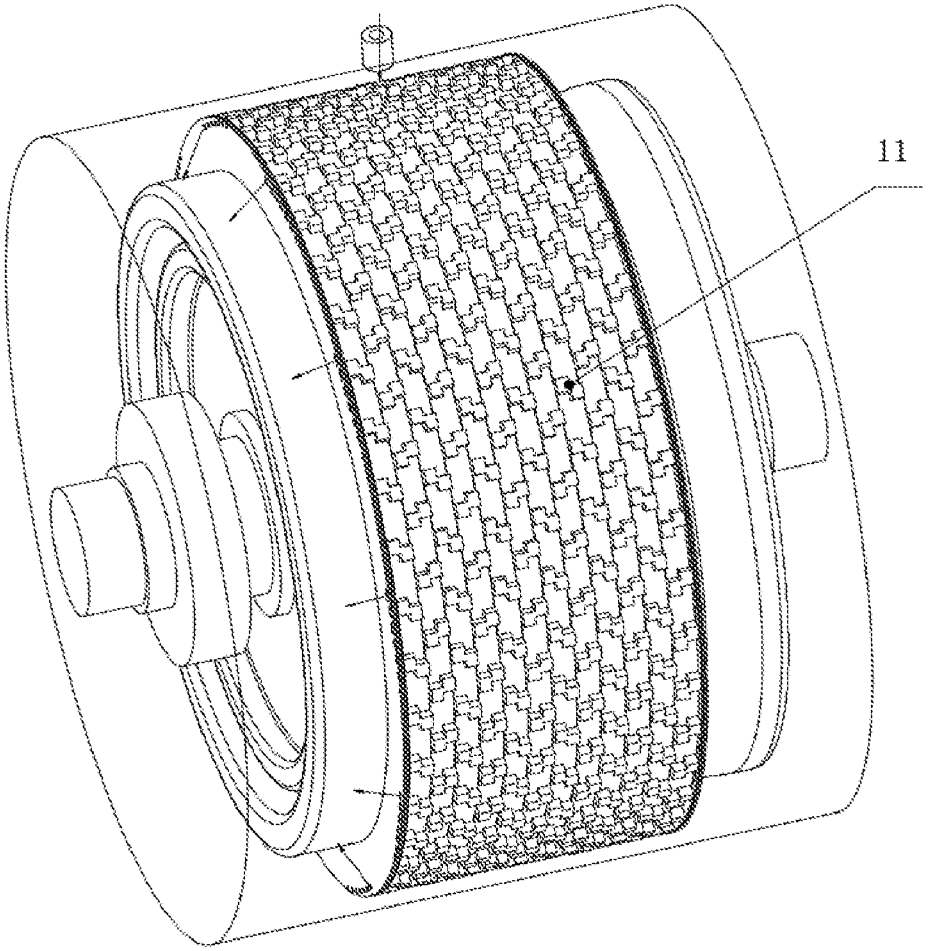
FIG. 14 illustrates a fifth schematic structural diagram of an arrangement of a heat sink of the Embodiment 1 of the present disclosure.

Or, as shown in FIG. 14, the plurality of heat sinks 11 are arranged in multiple groups; the multiple groups heat sinks 11 are sequentially arranged in the axis direction of the stator core; there are plurality of heat sinks 11 in each group. The heat sinks 11 in each group are arranged in the circumferential direction of the stator core. The heat sink 11 includes a first blocking piece and a second blocking piece. The first blocking piece is connected with the second blocking piece. Both the first blocking piece and the second blocking piece are arranged in the circumferential direction of the stator core, that is, the axis of the first blocking piece is perpendicular to the axis of the stator core. The axis of the second blocking piece is perpendicular to the axis of the stator core. The first blocking piece and the second blocking piece are arranged parallel to each other, and the first blocking piece and the second blocking piece are arranged in a stepped manner, so that the flowing speed of the cooling medium that flows through the heat sink 11 is increased; the heat sinks 11 in the two adjacent groups are arranged in a staggered manner; and the heat sinks 11 in the two adjacent groups are arranged symmetrically to divide the cooling medium into a plurality of flowing directions to flow through the heat sink 11 to form a turbulent flow behind the heat sink 11. The cooling medium is changed from a laminar state into a turbulent state, so that the cooling media are mixed after being separated, and the cooling media at different temperatures are mixed, which improves the heat dissipation performance of the motor.

A motor includes the oil cooled motor heat dissipation structure as described above.

When the motor works, the cooling medium enters a cooling medium flow chamber 5 from an oil inlet 7 in an upper part of a case 1 and flows along an outer surface of a stator core 2 in the chamber. The cooling medium is sprayed from oil spray channels 4 of oil spray parts 3 at two ends of the stator core 2 during flowing and is directly sprayed to a stator end winding 6. The cooling medium flows through an inner surface of a stator winding under the action of gravity and converges in internal space of a lower half part of the case 1, and the cooling medium flows out from an oil outlet 8 of the lower half part of the case 1. When the cooling medium is sprayed out from the oil spray channel 4, due to different widths of the oil spray holes 40, the cooling medium is sprayed out in a fan-shaped state, which increases the spraying area of the cooling medium and increases the heat dissipation area. After the cooling medium enters the cooling medium flow chamber 5, due to a small width of the oil spray channel 4, there can be oil resistance here. Under the action of the oil resistance, the cooling medium can fill the space of the cooling medium flow chamber, and all surfaces can be in contact with the oil to achieve an effect of dissipating heat. When the cooling medium flows in the cooling medium flow chamber 5, under a blocking action of the heat sinks 11, the cooling medium is changed from a laminar state into a turbulent state and is separated and mixed, which improves the flowing speed of the cooling medium, and improves the heat dissipation performance of the motor.

Embodiment 2

Comparing this embodiment with Embodiment 1, an oil spray structure 3 and an oil spray channel 4 are different in structures and are the same in the rest. The structure of the oil spray part 3 and the structure of the oil spray channel 4 are described below.

Figure 20:
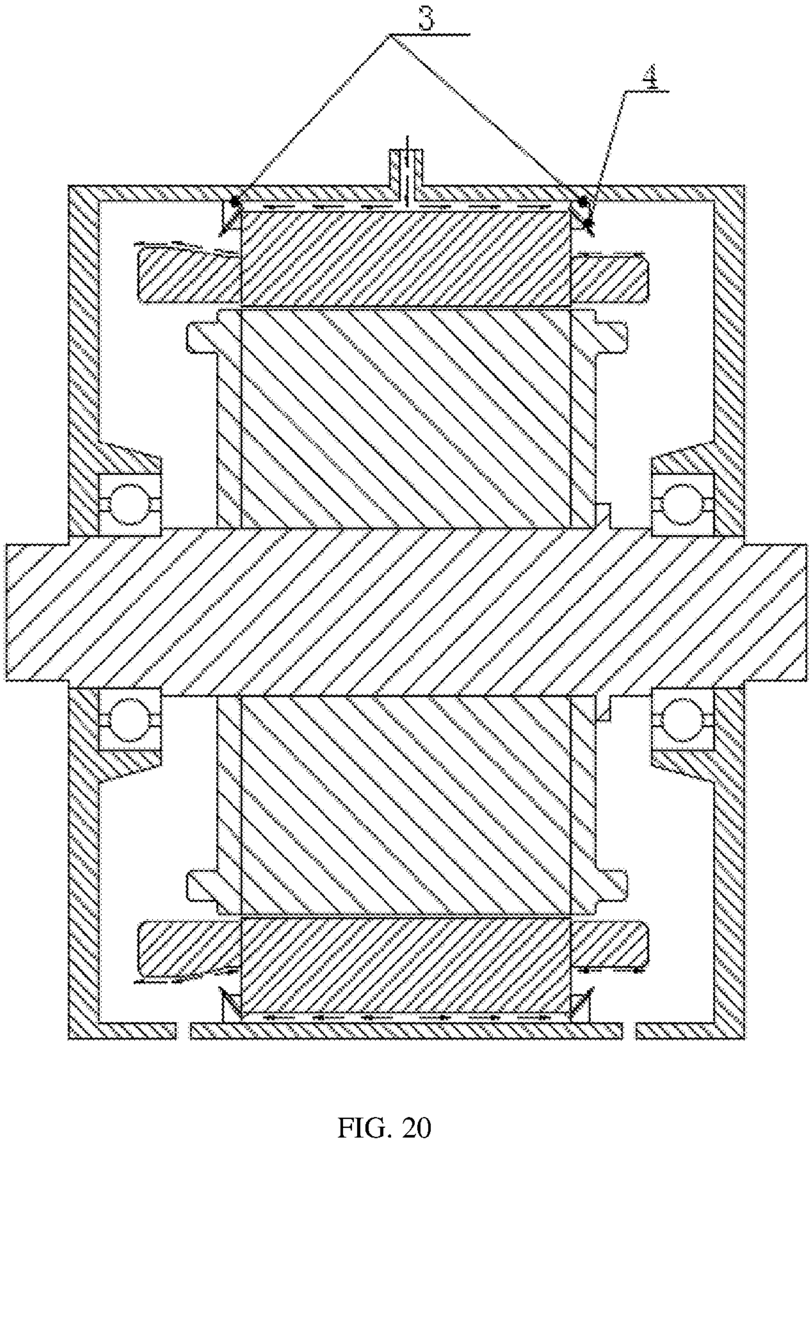
FIG. 20 illustrates a schematic diagram of a sectional structure of a motor of Embodiment 2 of the present disclosure.

In this embodiment, as shown in FIG. 20, the oil spray part 3 is an annular structure. The oil spray parts 3 are arranged at an end which is close to an outside diameter side of a stator core 2. An outside diameter of the oil spray part 3 is adapted to an inside diameter of a case 1 of a motor, so that an outside diameter surface of the oil spray part 3 is in contact with an inner surface of the case 1. The inside diameter of the oil spray part 3 is less than the outside diameter of the stator core 2, and the inside diameter of the oil spray part 3 is greater than the outside diameter of a stator end winding 6, so that the oil spray parts 3 are mounted at an end, close to an outside diameter side of the stator core 2. Two oil spray parts 3, the outer surface of the stator core 2 and the inner surface of the case 1 construct a cooling medium flow chamber 5.

The oil spray part 3 has a certain thickness. The oil spray channel 4 is arranged in an inclined manner and is arranged in an inclined manner from one side surface facing an end face of the stator core 2 to the other side surface, and the oil spray channel 4 points to the stator end winding 6. In this embodiment, the oil spray channel 4 includes a plurality of oil spray holes 40. The plurality of oil spray holes 40 are sequentially arranged from one side surface facing the stator core of the oil spray part to the other side surface. The distance between the axes of adjacent oil spray holes 40 is equal to 0, so that the oil spray channel 4 is a hole structure with a smooth inner wall. That is, the axes of the plurality of oil spray holes are overlapped and are arranged coaxially. The oil spray channel 4 is a through hole and is a polished hole, and a machining process is simple.

The oil spray part 3 can be an annular plate structure. At this moment, a plurality of oil spray holes 40 are integrally formed to construct the oil spray channel 4; or the oil spray part 3 can also be formed by a plurality of annular silicon steel sheets. Each annular silicon steel sheet is provided with an oil spray hole 40 and the oil spray holes 40 in the plurality of annular silicon steel sheets are formed coaxially.

There are a plurality of oil spray channels 4 arranged in the circumferential direction of the oil spray part 3. The thickness of the oil spray part 3 is selected according to actual demand, and there are no specific requirements here.

The diameter of the oil spray channel 4 can be an equal-diameter structure, or the diameter of the oil spray channel 4 can also be a variable-diameter structure. In this embodiment, preferably, the diameter of the oil spray channel 4 is a variable-diameter structure, the diameter of an oil inlet end is small, and the diameter of an oil outlet end is large, so that the cooling medium sprayed from the oil spray channel 4 is sprayed in a fan-shaped state.

The sectional shape of the oil spray channel 4 can be circular, or square, or elliptical, or rhombic, or other shapes, which is selected and set according to actual demand. There are no specific requirements here.

In this embodiment, the oil spray channel 4 intersects the axis of the stator core 2, an predetermined angle $\alpha$ is formed, and the predetermined angle $\alpha$ satisfies the following relational expression:

$$0<\alpha<\arctan(L/H)$$

L is the length of the stator end winding 6, H is a distance from the oil outlet of the oil spray channel 4 to the stator end winding 6, and the predetermined angle $\alpha$ is selected according to Land H.

A motor includes the oil cooled motor heat dissipation structure as described above.

When the motor works, the cooling medium enters a cooling medium flow chamber 5 from an oil inlet 7 in an upper part of a case 1 and flows along an outer surface of a stator core 2 in the chamber. The cooling medium is sprayed from oil spray channels 4 of oil spray parts 3 at two ends of the stator core 2 during flowing and is directly sprayed to a stator end winding 6. The cooling medium flows through an inner surface of a stator winding under the action of gravity and converges in internal space of a lower half part of the case 1, and the cooling medium flows out from an oil outlet 8 of the lower half part of the case 1. When the cooling medium is sprayed out from the oil spray channel 4, due to a variable-diameter structure of the oil spray holes 4, the cooling medium is sprayed out in a fan-shaped state, which increases the spraying area of the cooling medium and increases the heat dissipation area. After the cooling medium enters the cooling medium flow chamber 5, due to a small width of the oil spray channel 4, there can be oil resistance here. Under the action of the oil resistance, the cooling medium can fill the space of the cooling medium flow chamber, and all surfaces can be in contact with the oil to achieve an effect of dissipating heat. When the cooling medium flows in the cooling medium flow chamber 5, under a blocking action of the heat sinks 11, the cooling medium is changed from a laminar state into a turbulent state and is separated and mixed, which improves the flowing speed of the cooling medium and improves the heat dissipation performance of the motor.

Due to the adoption of the above technical solution, there are oil spray parts. The oil spray part is provided with a plurality of oil spray channels. The plurality of oil spray channels are arranged in the circumferential direction of the stator core. An outside diameter end of the oil spray part is in contact with an inner surface of the case of the motor. The oil spray parts are mounted at both ends of the stator core, so that the two oil spray parts, the outer surface of the stator core and the case construct the cooling medium flow chamber. A case part corresponding to the cooling medium flow chamber is provided with an oil inlet. The oil spray channel is arranged in an inclined manner and points to the stator end winding. The width of the oil inlet end of the oil spray channel is less than that of the oil outlet end, so that the cooling medium is sprayed in a fan-shaped state. Or, in the direction from the oil inlet end to the oil outlet end of the oil spray channel, the widths of the oil spray channel are the same, so that the cooling medium is sprayed in a cylindrical state and sprayed onto the stator end winding in a larger area, which omits an oil pipe and an oil pipe connector and simplifies structure and a mounting process, and improves the heat dissipation efficiency. The oil spray channel is formed by a plurality of oil spray holes, the widths of the oil spray holes are different, and the distances from each oil spray hole to the axis of the stator core are different, so that the oil spay channel is of a stepped channel, which increases the flowing speed of a cooling medium. Heat dissipation of the stator core and heat dissipation of an end winding adopt a design of a series cooling oil way. Each part is subjected to heat dissipation by using a maximum flow rate of the cooling medium, and the utilization rate of the cooling medium is greater. The cooling medium enters the cooling medium flow chamber. Since the width of the stepped oil spray channel is small, there will be oil resistance here. Under the action of oil resistance, the cooling medium will fill the space of the cooling medium flow chamber, and all surfaces can be in contact with the oil to achieve an effect of dissipating heat. The heat sinks are arranged on the outer surface of the stator core, which can change the cooling medium from a laminar state into a turbulent state, increases the heat dissipation area of the middle part of the stator core, increases the flowing speed of oil, and improves the heat dissipation performance of the motor.

The embodiments of the present disclosure are described above in detail. However, the content is only preferred embodiments of the present disclosure and cannot be considered as a limitation of the scope of implementation of the present disclosure. All equivalent changes, improvements, and the like made in accordance with the scope of application of the present disclosure shall still fall within the scope of the patent coverage of the present disclosure.

The invention claimed is:

1. An oil cooled motor heat dissipation structure, comprising:

oil spray parts, the oil spray parts are disposed on two ends of a stator core; an outside diameter of the oil spray part is not less than an outside diameter of the stator core, and the oil spray part is in contact with a case; an outer surface of the stator core, the case and the oil spray parts construct a cooling medium flow chamber, so as to facilitate the flowing of a cooling medium in the cooling medium flow chamber along the outer surface of the stator core;

the oil spray part comprises an oil spray channel; one end of the oil spray channel is communicated with the cooling medium flow chamber, and the other end of the oil spray channel is communicated with a chamber inside the motor; the oil spray channel is tilted from an end face of the oil spray part to a direction of a stator end winding, so that the cooling medium is sprayed to the stator end winding from the cooling medium flow chamber along the oil spray channel;

the oil spray channel comprises a plurality of oil spray holes; the plurality of oil spray holes are sequentially disposed along one side surface of the oil spray part which faces the stator core to the other side surface of the oil spray part; there is a distance between axes of the adjacent oil spray holes, and the plurality of oil spray holes are arranged in an inclined direction;

wherein the axes of the oil spray channel and the stator core intersect and form a predetermined angle a, and the predetermined angle a satisfies the following relational expression:

$$0<a<\arctan(L/H)$$

wherein L is the length of the stator end winding, and H is a distance from the oil outlet of the oil spray channel to the stator end winding;

wherein the distance between the axes of the adjacent oil spray holes is greater than 0, and the oil spray channel is a hole structure with a stepped inner wall.

2. The oil cooled motor heat dissipation structure as claimed in claim 1, wherein the axes of the plurality of oil spray holes are parallel to each other, and along one side surface of the oil spray part which faces the stator core to the other side surface of the oil spray part, the distances between the axes of the plurality of oil spray holes and the axis of the stator core are sequentially decreased.

3. The oil cooled motor heat dissipation structure as claimed in claim 2, wherein in a direction from an oil inlet end to an oil outlet end of the oil spray channel, the width of the oil spray hole along a circumferential direction of the stator core is gradually increased.

4. The oil cooled motor heat dissipation structure as claimed in claim 2, wherein in a direction from an oil inlet end to an oil outlet end of the oil spray channel, the width of the oil spray hole along a circumferential direction of the stator core is the same.

5. The oil cooled motor heat dissipation structure as claimed in claim 1, wherein the shape of the oil spray hole is circular, or square, or elliptical, or rhombic.

6. The oil cooled motor heat dissipation structure as claimed in claim 1, the oil spray channel further comprises a first oil spray hole; and the first oil spray hole is disposed on one end of the plurality of oil spray holes, or the oil spray channel further comprises first oil spray holes, the first oil spray holes are disposed on both ends of the plurality of oil spray holes.

7. The oil cooled motor heat dissipation structure as claimed in claim 6, wherein in an axis direction of the stator core, the length of the first oil spray hole is greater than the length of any oil spray hole in the plurality of oil spray holes.

8. The oil cooled motor heat dissipation structure as claimed in claim 7, wherein a plurality of heat sinks are disposed on an outer surface of the stator core; and the plurality of heat sinks are disposed in the circumferential direction of the stator core.

9. The oil cooled motor heat dissipation structure as claimed in claim 1, wherein the oil spray part comprises a plurality of silicon steel sheets of at least one type; the plurality of silicon steel sheets are all disposed coaxially with the stator core; the silicon steel sheet is an annular structure; a plurality of stator slots are disposed on a side which is close to an inside diameter end of the silicon steel sheet in a circumferential direction; and the plurality of stator slots are in one-to-one correspondence with slots of the stator core, so as to facilitate the arrangement of a stator winding.

10. The oil cooled motor heat dissipation structure as claimed in claim 9, wherein a plurality of oil spray holes are disposed on one side which is close to an outside diameter end of each silicon steel sheet; the plurality of oil spray holes are disposed in the circumferential direction of the silicon steel sheet; the plurality of oil spray holes are at least disposed on an upper half part of the silicon steel sheet which is disposed inside the motor;

the plurality of oil spray holes are disposed in at least one row in a radial direction of the silicon steel sheet;

the distances from the oil spray holes in different silicon steel sheets to the axis of the stator core are different; the distances from the plurality of oil spray holes in each row of each silicon steel sheet to the axis of the stator core are the same; and the positions of the oil spray holes in the plurality of silicon steel sheets are in one-to-one correspondence, so as to construct the oil spray channel.

11. The oil cooled motor heat dissipation structure as claimed in claim 10, wherein a plurality of heat sinks are disposed on an outer surface of the stator core; and the plurality of heat sinks are disposed in the circumferential direction of the stator core.

12. The oil cooled motor heat dissipation structure as claimed in claim 9, wherein multiple groups oil spray holes are disposed on one side which is close to the outside diameter end of each silicon steel sheet; the multiple groups oil spray holes are disposed in the circumferential direction of the silicon steel sheet; the multiple groups oil spray holes are at least disposed on an upper half part of the silicon steel sheet which is disposed inside the motor;

the multiple groups oil spray holes are disposed in at least one row in a radial direction of the silicon steel sheet;

in each group of the oil spray holes, the distances from the plurality of oil spray holes to the axis of the stator core are sequentially increased or sequentially decreased; each of the oil spray holes corresponds to one of the stator slots;

when the plurality of silicon steel sheets are installed, a first silicon steel sheet is taken as a basis, a Nth silicon steel sheet is disposed in a manner of rotating by an angle of $(N-1)\times(M+1)$ stator slot relative to the first silicon steel sheet to construct the oil spray channel, wherein M is a number of stator slots between two adjacent oil spray holes.

13. The oil cooled motor heat dissipation structure as claimed in claim 1, wherein a plurality of heat sinks are disposed on an outer surface of the stator core; and the plurality of heat sinks are disposed in the circumferential direction of the stator core.

14. The oil cooled motor heat dissipation structure as claimed in claim 13, wherein the plurality of heat sinks are disposed in multiple groups; multiple groups heat sinks are sequentially disposed in the circumferential direction of the stator core; each of the multiple groups heat sinks comprises a first blocking rod, a second blocking rod and a third blocking rod; the first blocking rod, the second blocking rod and the third blocking rod are all disposed in an axis direction of the stator core, and the first blocking rod and the second blocking rod are disposed on a same straight line; a gap is disposed between the first blocking rod and the second blocking rod; the third blocking rod is disposed at any side of the first blocking rod; the third blocking rod corresponds to the gap between the first blocking rod and the second blocking rod;

or, the length of the heat sink is less than the length of the stator core, and the plurality of heat sinks are disposed in an S-shape;

or, the plurality of heat sinks are disposed in multiple groups; the multiple groups heat sinks are sequentially disposed in the axis direction of the stator core; each of the multiple groups heat sinks are disposed in the circumferential direction of the stator core, and each heat sink intersects the axis of the stator core; the heat sinks in adjacent two groups are disposed in a staggered manner; in the axis direction of the stator core, a plurality of heat dissipation areas are disposed on the outer surface of the stator core; the multiple groups heat sinks are disposed on each of the heat dissipation areas; first inclination directions of the heat sinks in two groups which are disposed on both sides of the heat dissipation area are consistent; second inclination directions of the heat sinks in the remaining groups except the two groups which are disposed on both sides of the heat dissipation area are consistent, and the second inclination directions of the heat sinks in the remaining groups and the first inclination directions of the heat sinks in the two groups which are disposed on both sides of the heat dissipation area are disposed symmetrically;

or, the plurality of heat sinks are disposed in multiple groups; the multiple groups heat sinks are sequentially disposed in the axis direction of the stator core; each of the multiple groups heat sinks are disposed in the circumferential direction of the stator core, and each heat sink intersects the axis of the stator core; the heat sinks in adjacent two groups are disposed in a staggered manner, and the inclination directions of the heat sinks in the two groups are disposed symmetrically;

or, the plurality of heat sinks are disposed in multiple groups; the multiple groups heat sinks are sequentially disposed in the axis direction of the stator core; each of the multiple groups heat sinks are disposed in the circumferential direction of the stator core, and the heat sink comprises a first blocking piece and a second blocking piece; the first blocking piece is connected with the second blocking piece; both the first blocking piece and the second blocking piece are disposed in the circumferential direction of the stator core; the first blocking piece and the second blocking piece are disposed in a stepped manner; the heat sinks in the two adjacent groups are disposed in a staggered manner; and the heat sinks in the two adjacent groups are disposed symmetrically.

15. The oil cooled motor heat dissipation structure as claimed in claim 1, wherein a number of oil spray channels is multiple, the oil spray channels are disposed on an upper half part of the oil spray part which is at least located inside the motor; and multiple oil spray channels are disposed in a circumferential direction of the oil spray part.

16. A motor, comprising the oil cooled motor heat dissipation structure as claimed in claim 1.

* * * * *